United States Patent
Nakano et al.

(10) Patent No.: US 9,627,936 B2
(45) Date of Patent: Apr. 18, 2017

(54) PERMANENT MAGNET MOTOR

(75) Inventors: Masatsugu Nakano, Chiyoda-ku (JP);
Yoshihito Asao, Chiyoda-ku (JP);
Satoru Akutsu, Chiyoda-ku (JP);
Ryuichi Takiguchi, Chiyoda-ku (JP);
Yuji Takizawa, Chiyoda-ku (JP); Yu Hirotani, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 505 days.

(21) Appl. No.: 14/239,968

(22) PCT Filed: Dec. 23, 2011

(86) PCT No.: PCT/JP2011/079948
§ 371 (c)(1),
(2), (4) Date: Feb. 20, 2014

(87) PCT Pub. No.: WO2013/094075
PCT Pub. Date: Jun. 27, 2013

(65) Prior Publication Data
US 2014/0191628 A1    Jul. 10, 2014

(51) Int. Cl.
*H02K 21/12*    (2006.01)
*H02K 3/28*    (2006.01)
(Continued)

(52) U.S. Cl.
CPC .............. *H02K 3/28* (2013.01); *H02K 1/276* (2013.01); *H02K 1/278* (2013.01); *H02K 1/2746* (2013.01);
(Continued)

(58) Field of Classification Search
CPC ..... H02K 1/2746; H02K 1/2773; H02K 1/276
(Continued)

(56) References Cited

U.S. PATENT DOCUMENTS

| 5,378,953 A * | 1/1995 | Uchida | H02K 21/14 |
| | | | 310/156.57 |
| 5,508,576 A * | 4/1996 | Nagate | C08L 23/02 |
| | | | 310/156.54 |

(Continued)

FOREIGN PATENT DOCUMENTS

| CN | 1112757 C | 6/2003 |
| CN | 100553074 C | 10/2009 |

(Continued)

OTHER PUBLICATIONS

International Search Report of PCT/JP2011/079948, dated Mar. 19, 2012.
(Continued)

*Primary Examiner* — Hanh Nguyen
(74) *Attorney, Agent, or Firm* — Sughrue Mion, PLLC; Richard C. Turner

(57) ABSTRACT

A permanent magnet motor in which electromagnetic excitation force of low spatial order is reduced, and influence of a magnetomotive force harmonic of a rotor and torque ripple is reduced. One set of armature windings receives current from a first inverter, and another set of armature windings receives current from a second inverter. Where a pole number of a rotor is M and the number of slots of a stator core is Q, M and Q satisfy M<Q and a greatest common divisor of M and Q is equal to or greater than 3. In the rotor, the iron core is located beyond a radius intermediate the maximum outer radius and the minimum inner radius of the permanent magnets. A phase difference between three-phase currents from the first and second inverters is in a range of electrical angles of 20 to 40 degrees.

13 Claims, 16 Drawing Sheets

(51) Int. Cl.
*H02K 1/27* (2006.01)
*H02K 3/12* (2006.01)
*H02K 11/225* (2016.01)
*H02K 29/08* (2006.01)
*H02K 29/12* (2006.01)
*H02K 1/24* (2006.01)

(52) U.S. Cl.
CPC ............ *H02K 1/2773* (2013.01); *H02K 3/12* (2013.01); *H02K 11/225* (2016.01); *H02K 1/246* (2013.01); *H02K 29/08* (2013.01); *H02K 29/12* (2013.01)

(58) Field of Classification Search
USPC ........................................ 310/156.01–156.84
See application file for complete search history.

(56) References Cited

U.S. PATENT DOCUMENTS

| | | | |
|---|---|---|---|
| 6,271,616 | B1 | 8/2001 | Akemakou |
| 6,958,602 | B2* | 10/2005 | Matsuura ............. G01D 5/2046 310/168 |
| 7,088,025 | B2* | 8/2006 | Kujirai ................. G01D 5/2046 310/168 |
| 2006/0066167 | A1 | 3/2006 | Saito et al. |
| 2006/0113858 | A1* | 6/2006 | Hino ....................... H02K 1/276 310/156.53 |
| 2007/0252469 | A1 | 11/2007 | Nishiura et al. |
| 2011/0181230 | A1 | 7/2011 | Yamada et al. |
| 2011/0278978 | A1 | 11/2011 | Taniguchi et al. |
| 2012/0139372 | A1 | 6/2012 | Nakano et al. |
| 2012/0139380 | A1* | 6/2012 | Taniguchi ............ H02K 1/2746 310/156.48 |
| 2012/0187893 | A1 | 7/2012 | Baba et al. |
| 2012/0242182 | A1* | 9/2012 | Yabe ...................... H02K 29/03 310/156.53 |
| 2014/0145547 | A1 | 5/2014 | Nakano et al. |

FOREIGN PATENT DOCUMENTS

| | | |
|---|---|---|
| EP | 2 768 126 A1 | 8/2014 |
| JP | 5-344668 A | 12/1993 |
| JP | 5-344688 A | 12/1993 |
| JP | 7-264822 A | 10/1995 |
| JP | 9-327139 A | 12/1997 |
| JP | 2002-534047 A | 10/2002 |
| JP | 2006-50709 A | 2/2006 |
| JP | 2006-101654 A | 4/2006 |
| JP | 2006-238667 A | 9/2006 |
| JP | 2008-11692 A | 1/2008 |
| JP | 2010-226899 A | 10/2010 |
| JP | 2011-114941 A | 6/2011 |
| WO | 2011/064834 A1 | 6/2011 |

OTHER PUBLICATIONS

Communication dated Nov. 17, 2015 from the State Intellectual Property Office of the P.R.C. in counterpart application No. 201180075568.4.

Communication dated May 11, 2016 from European Patent Office in counterpart Application No. 11878174.9.

* cited by examiner (a) EXAMPLE IN WHICH SLOT NUMBER
FOR EACH POLE FOR EACH PHASE IS 2

(b) EXAMPLE IN WHICH SLOT NUMBER
FOR EACH POLE FOR EACH PHASE IS 4

ANGLE (DEGREE), ELECTRIC ANGLE

PERMANENT MAGNET MOTOR

CROSS REFERENCE TO RELATED APPLICATIONS

This application is a National Stage of International Application No. PCT/JP2011/079948 filed Dec. 23, 2011, the contents of all of which are incorporated herein by reference in their entirety.

TECHNICAL FIELD

The present invention relates to a permanent magnet motor, and particularly, to a motor used in an electric power steering apparatus for vehicle.

BACKGROUND ART

As a motor of this type, Patent Document 1 discloses a permanent magnet motor of concentrated-winding and surface-magnet type, with 10 poles and 12 slots, having a multi-phased and multiplexed configuration.

In addition, Patent Document 2 discloses a permanent magnet motor for electric power steering apparatus, of interior magnet type, in which more permanent magnets than the number of concentration-wound salient poles (slot number) are provided.

In addition, Patent Document 3 discloses a permanent magnet motor of consequent-pole type with 14 poles and 12 slots, which is driven by a first drive circuit and a second drive circuit.

CITATION LIST

Patent Document

Patent Document 1: Japanese Laid-Open Patent Publication No. 7-264822
Patent Document 2: Japanese Laid-Open Patent Publication No. 2006-50709
Patent Document 3: Japanese Laid-Open Patent Publication No. 2011-114941

SUMMARY OF THE INVENTION

Problems to be Solved by the Invention

However, the structure of Patent Document 1 has a problem that since a surface magnet motor is used, reluctance torque cannot be obtained and torque during high-speed rotation is small.

The structures of Patent Document 2 and Patent Document 3 have a problem that since an electromagnetic excitation force of a low spatial order is generated, vibration and noise of the electric power steering apparatus are increased.

The present invention has been made to solve the above problems, and an object of the present invention is to obtain a permanent magnet motor in which an electromagnetic excitation force of a low spatial order is reduced, and influence of a magnetomotive force harmonic of a rotor is reduced so that torque ripple is reduced.

Solution to the Problems

The present invention is a permanent magnet motor including: a rotor including a rotor iron core and a plurality of permanent magnets provided in the rotor iron core; and a stator including a stator iron core and two sets of three-phase armature windings provided in a plurality of slots formed in the stator iron core. One set of the armature windings is supplied with current from a first inverter, and the other set of the armature windings is supplied with current from a second inverter. In the case where a pole number of the rotor is M and a slot number of the stator iron core is Q, M and Q satisfy a relationship of M<Q and a greatest common divisor of M and Q is equal to or greater than 3. In the rotor, the rotor iron core is located on the stator side beyond a radius intermediate between the maximum outer radius and the minimum inner radius of the permanent magnets. A phase difference between three-phase currents supplied from the first inverter and three-phase currents supplied from the second inverter is controlled to fall within a range of electrical angles of 20 to 40 degrees.

Effect of the Invention

The present invention makes it possible to obtain a permanent magnet motor in which an electromagnetic excitation force of a spatial order of 2 or less is greatly reduced, thereby greatly reducing vibration and noise, and even if a rotor-side magnetomotive force includes a harmonic of fifth order or seventh order on an electrical-angle basis, torque ripple, vibration, and noise are reduced.

DESCRIPTION OF EMBODIMENTS

Hereinafter, preferred embodiments of a permanent magnet motor for electric power steering of the present invention will be described with reference to the drawings.

Embodiment 1

Figure 1:
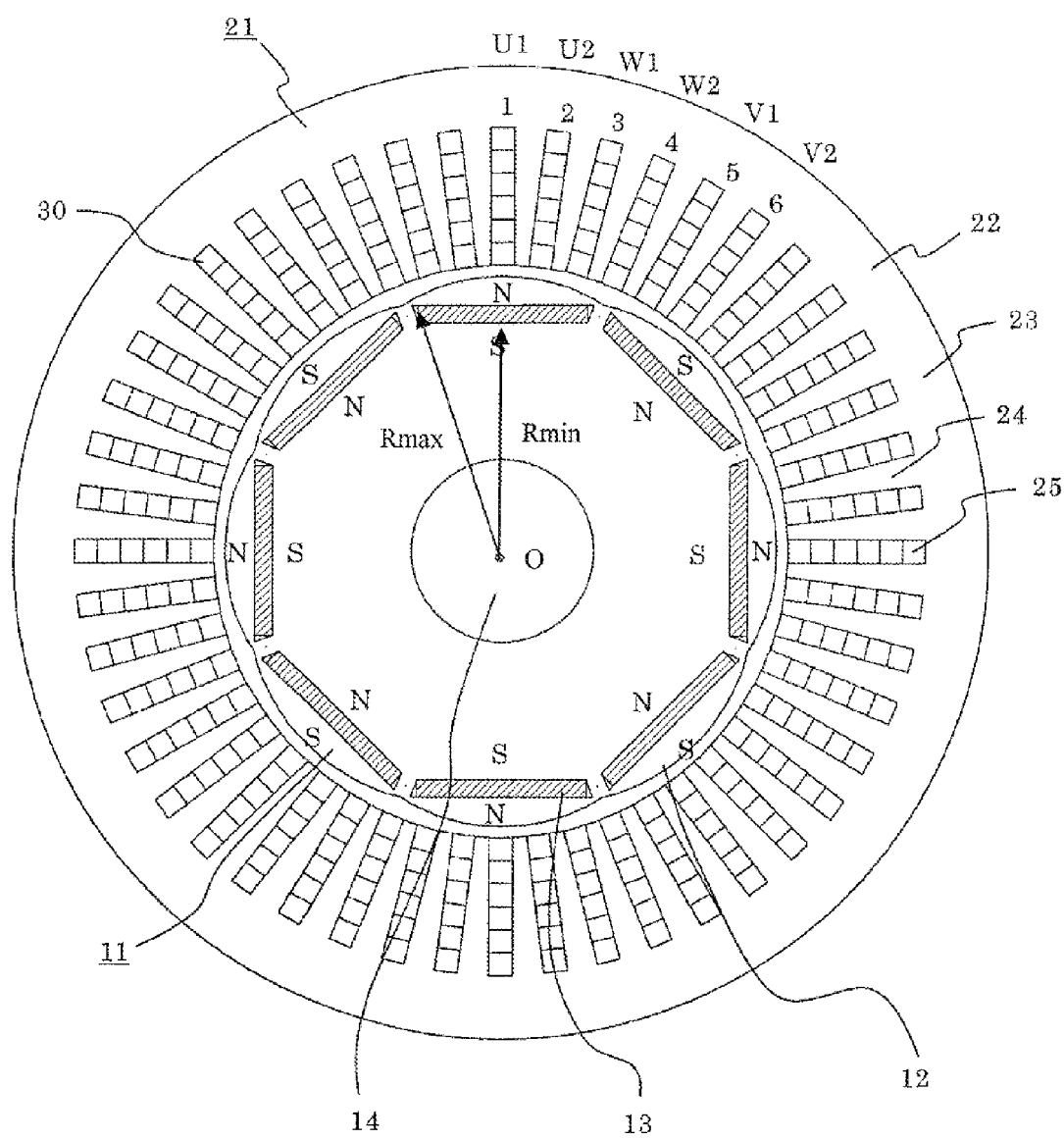
FIG. 1 is a sectional view showing a permanent magnet motor of embodiment 1 of the present invention.

FIG. 1 is a sectional view showing a permanent magnet motor 10 of embodiment 1, which uses planar permanent magnets 13 and has 8 poles and 48 slots, as an example.

A rotor 11 is rotatably provided inside a stator 21, and has a shaft 14, a rotor iron core 12 provided outside the shaft 14, and eight planar permanent magnets 13 embedded in the rotor iron core 12 and arranged at regular intervals.

N and S in FIG. 1 indicate the polarities of the permanent magnets 13. That is, in FIG. 1, magnets having different polarities are alternately arranged. A surface of the rotor iron core 12 on the outer circumferential side as seen from each permanent magnet 13, which opposes to a stator iron core 22, has a curved-plane shape.

On the other hand, the stator 21 has the stator iron core 22 provided with a core back 23, teeth 24, and slots 25, and armature windings 30 of distributed winding type provided in the slots 25.

Regarding the arrangement of the armature windings 30, the armature windings 30 indicated by U1, U2, W1, W2, V1, and V2 are respectively provided in the slots 25 indicated by 1 to 6 in FIG. 1. Similarly, also for the seventh to forty-eighth slots 25, the pattern of U1, U2, W1, W2, V1, and V2 is repeated seven times. It is noted that the direction of current flow is inverted between windings at positions separated from each other by 6 slots.

Here, U1, U2, W1, W2, V1, and V2 indicate that there are two sets of three-phase armature windings 30, and specifically, the first U-phase winding is U1, the second U-phase winding is U2, the first V-phase winding is V1, the second V-phase winding is V2, the first W-phase winding is W1, and the second W-phase winding is W2.

U1, V1, and W1 form first armature windings 30-1, which are connected to a first inverter, and U2, V2, and W2 form second armature windings 30-2, which are connected to a second inverter.

In FIG. 1, in the rotor 11, the rotor iron core 12 is located on the stator 21 side beyond a radius intermediate between a maximum outer radius Rmax and a minimum inner radius Rmin of the permanent magnet 13.

In FIG. 1, Rmax is based on a rotation center O, and is the length of a straight line connecting the rotation center and a point on the permanent magnet 13 that is most distant from the rotation center. It is noted that the rotation center O and the point that is most distant from the rotation center are two points on a plane perpendicular to the shaft 14. Such a value Rmax is defined as the maximum outer radius of the permanent magnet 13.

Rmin is based on the rotation center O, and is the length of a straight line connecting the rotation center and a point on the permanent magnet 13 that is closest to the rotation center. It is noted that the rotation center O and the point that is closest to the rotation center are two points on a plane perpendicular to the shaft 14. Such a value Rmin is defined as the minimum outer radius of the permanent magnet 13.

A radius Rc intermediate between the maximum outer radius Rmax and the minimum outer radius Rmin of the permanent magnet 13 is defined by Rc=(Rmax+Rmin)/2.

In such a configuration, reluctance torque can be obtained by using change in the magnetic resistance of the rotor iron core 12. In a motor causing reluctance torque, a d-axis inductance is large and therefore flux weakening control is effectively exerted, whereby torque during high-speed rotation is improved.

However, since the rotor iron core 12 is present near the stator 21, a magnetic gap length is small as compared to the case of surface-magnet type, and therefore an electromagnetic excitation force and torque ripple tend to increase.

In addition, in an interior magnet type, magnetomotive force harmonics caused on the rotor side tend to include larger amounts of fifth and seventh components (in the case where a component having an electrical angle cycle of 360 degrees is defined as first order) than in a surface-magnet type, thereby causing a problem of increasing an electromagnetic excitation force and torque ripple.

The present invention is to solve such problems and provide a configuration that can reduce both torque ripple and an electromagnetic excitation force, in which a permanent magnet motor 10 includes: the rotor 11 including the rotor iron core 12 and the plurality of permanent magnets 13 provided in the rotor iron core 12; and the stator 21 including the stator iron core 22 and the two sets of three-phase armature windings 30 provided in the plurality of slots 25 formed in the stator iron core 22, wherein one set of armature windings 30-1 is supplied with current from the first inverter, and the other set of armature windings 30-2 is supplied with current from the second inverter, wherein in the case where the pole number of the rotor 11 is M and the number of the slots 25 of the stator iron core 22 is Q, M and Q satisfy a relationship of M<Q and a greatest common divisor of M and Q is equal to or greater than 3, wherein in the rotor 11, the rotor iron core 12 is located on the stator 21 side beyond a radius intermediate between the maximum outer radius and the minimum inner radius of the permanent magnet 13, and wherein a phase difference between three-phase currents supplied from the first inverter and three-phase currents supplied from the second inverter is controlled to fall within a range of electrical angles of 20 to 40 degrees.

Figure 2:
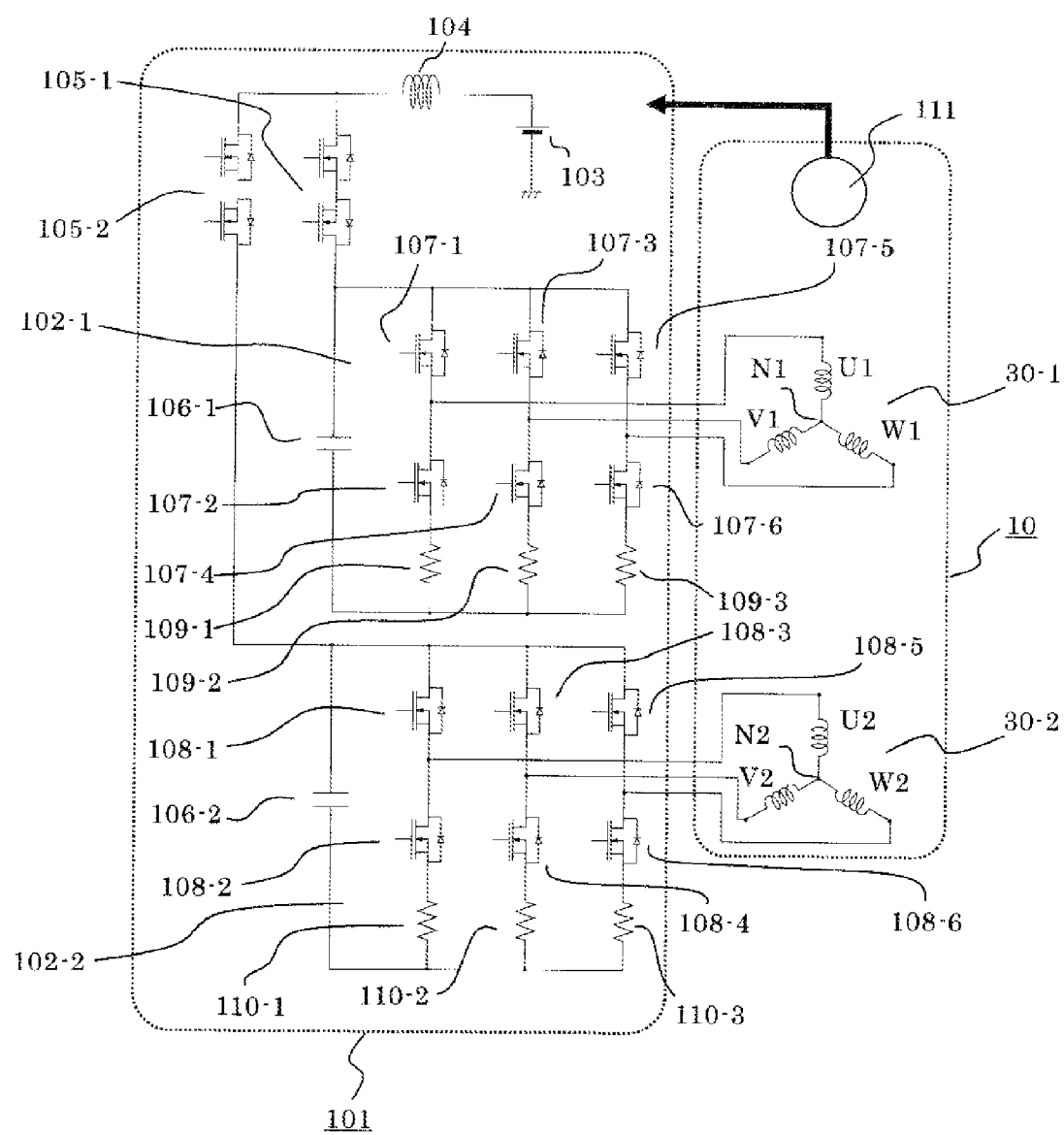
FIG. 2 is a circuit configuration diagram showing a driving circuit of the permanent magnet motor of embodiment 1.

FIG. 2 is a circuit configuration diagram showing a driving circuit of the motor 10 of embodiment 1.

The motor 10 is a permanent magnet motor of distributed winding type in which the pole number is 8 and the slot number is 48 as described in FIG. 1. In FIG. 2, the details are omitted for the purpose of simplification, and only the armature windings 30 of the motor 10 are shown.

The armature windings 30 of the motor 10 include the first armature windings 30-1 composed of the first U-phase winding U1, the first V-phase winding V1, and the first W-phase winding W1, and the second armature windings 30-2 composed of the second U-phase winding U2, the second V-phase winding V2, and the second W-phase winding W2. The details of an ECU (control unit) 101 are also omitted for the purpose of simplification, and only a power circuit part of the inverter is shown.

The ECU 101 includes two inverters 102, i.e., inverters 102-1 and 102-2, which respectively supply three-phase currents to the first and second armature windings 30-1 and 30-2.

The ECU 101 is supplied with DC power from a power supply 103 such as a battery, to which a power supply relay 105 is connected via a coil 104 for noise removal.

In FIG. 2, the power supply 103 appears to be present inside the ECU 101, but actually, power is supplied via a connector from an external power supply such as a battery. The power supply relay 105 includes two power supply relays 105-1 and 105-2 each composed of two MOS-FETs.

Upon failure or the like, the power supply relay 105 is opened to prevent excessive current from flowing.

It is noted that although the power supply 103, the coil 104, and the power supply relay 105 are connected in this order in FIG. 2, as a matter of course, the power supply relay 105 may be provided closer to the power supply 103 than the coil 104 is.

The inverter 102-1 and the inverter 102-2 are each composed of a bridge using six MOS-FETs. In the inverter 102-1, a MOS-FET 107-1 and a MOS-FET 107-2 are connected in series, a MOS-FET 107-3 and a MOS-FET 107-4 are connected in series, and a MOS-FET 107-5 and a MOS-FET 107-6 are connected in series, and the three pairs of MOS-FETs are connected in parallel.

Further, one shunt resistor is connected to the GND (ground) side of each of the three lower-side MOS-FETs 107-2, 107-4, and 107-6, and the shunt resistors are represented as a shunt 109-1, a shunt 109-2, and a shunt 109-3, respectively. These shunt resistors are used for detection of a current value.

It is noted that although an example of using three shunts is shown, current detection can be performed even by two shunts or one shunt, and therefore, as a matter of course, such a configuration may be employed.

Regarding current supply to the motor 10 side, as shown in FIG. 2, current is supplied from between the MOS-FETs 107-1 and 107-2 through a bus bar or the like to U1 phase of the motor 10, current is supplied from between the MOS-FETs 107-3 and 107-4 through a bus bar or the like to V1 phase of the motor 10, and current is supplied from between the MOS-FETs 107-5 and 107-6 through a bus bar or the like to W1 phase of the motor 10.

The inverter 102-2 also has the same configuration. In the inverter 102-2, a MOS-FET 108-1 and a MOS-FET 108-2 are connected in series, a MOS-FET 108-3 and a MOS-FET 108-4 are connected in series, and a MOS-FET 108-5 and a MOS-FET 108-6 are connected in series, and the three pairs of MOS-FETs are connected in parallel.

Further, one shunt resistor is connected to the GND (ground) side of each of the three lower-side MOS-FETs 108-2, 108-4, and 108-6, and the shunt resistors are represented as a shunt 110-1, a shunt 110-2, and a shunt 110-3, respectively.

These shunt resistors are used for detection of a current value. It is noted that although an example of using three shunts is shown, current detection can be performed even by two shunts or one shunt, and therefore, as a matter of course, such a configuration may be employed.

Regarding current supply to the motor 10 side, as shown in FIG. 2, current is supplied from between the MOS-FETs 108-1 and 108-2 through a bus bar or the like to U2 phase of the motor 10, current is supplied from between the MOS-FETs 108-3 and 108-4 through a bus bar or the like to V2 phase of the motor 10, and current is supplied from between the MOS-FETs 108-5 and 108-6 through a bus bar or the like to W2 phase of the motor 10.

The two inverters 102-1 and 102-2 perform switching by a signal sent from a control circuit (not shown) to the MOS-FETs in accordance with a rotation angle detected by a rotation angle sensor 111 provided on the motor 10, thereby supplying desired three-phase currents to the first and second armature windings 30-1 and 30-2, respectively.

It is noted that a resolver, a GMR sensor, an MR sensor, or the like are used as the rotation angle sensor 111.

When three-phase currents are made to flow in the armature windings 30-1 and the armature windings 30-2 by the first inverter 102-1 and the second inverter 102-2, if the phase difference between the armature windings 30-1 and the armature windings 30-2 is set to be an electrical angle of 20 to 40 degrees, or desirably, an electrical angle of 30 degrees, a sixth order component (in the case where a component having an electrical angle cycle of 360 degrees is defined as first order) of torque ripple is greatly reduced.

The reason is as follows. That is, even if magnetomotive force harmonics caused on the rotor 11 side include fifth order and seventh order components (in the case where a component having an electrical angle cycle of 360 degrees is defined as first order), the fifth order and seventh order components disappear or are greatly reduced in a magnetomotive force waveform on the armature side by changing the phases of currents in the armature windings 30-1 and the armature windings 30-2.

This phase difference may be changed in accordance with the driving state of the motor 10, or may be fixed at an electrical angle of 30 degrees, for example.

It is noted that in the case where the phase difference is fixed at an electrical angle of 30 degrees, the winding factor is improved in an equivalent sense, and torque is also improved. Therefore, large torque can be obtained with a small amount of permanent magnets 13, thus providing an effect of contribution to cost reduction of the motor 10.

Patent Document 1 discloses an example in which the pole number is 10 and the slot number is 12, and in this case, an electromagnetic excitation force of second spatial order occurs. Patent Document 2 discloses an example in which the pole number is 10 and the slot number is 9, an example in which the pole number is 20 and the slot number is 18, and an example in which the pole number is 22 and the slot number is 21. In these cases, electromagnetic excitation forces of second spatial order, first spatial order, and second spatial order occur, respectively.

In addition, Patent Document 3 discloses a consequent-pole type in which the pole number is 14 (the number of magnets is 7) and the slot number is 12. In this case, the magnetic circuit is not rotationally symmetric, and therefore an electromagnetic excitation force of first spatial order occurs.

Thus, in the conventional examples, electromagnetic excitation forces of first spatial order and second spatial order occur, thereby causing a problem of vibration and noise on electric power steering apparatuses.

An electromagnetic excitation force of first spatial order serves as an electromagnetic force that vibrates a rotor always in the radial direction, and therefore especially large vibration and noise occur. An electromagnetic excitation force of second spatial order deforms the stator 21 into elliptic shape, and therefore, as compared to the case of third or higher spatial order under the same value of electromagnetic excitation force, deformation amount of a stator or a frame is large, so that vibration and noise may be caused.

Further, in a motor of interior magnet type, a rotor iron core is located on a stator side beyond a radius intermediate between the maximum outer radius and the minimum inner radius of a permanent magnet, and therefore a problem arises that an electromagnetic excitation force in this case also increases.

However, in the configuration in FIG. 1, an electromagnetic excitation force of second or lower spatial order does not occur. In FIG. 1, the pole number is 8 and the slot number is 48, and the armature windings 30 are arranged so as to have symmetry at six-slot intervals, i.e., mechanical angle intervals of 45 degrees as described above. In the rotor 11, there is rotational symmetry at one-pole intervals, i.e., mechanical angle intervals of 45 degrees though polarities are opposite to each other.

Therefore, the spatial distribution of an electromagnetic force has symmetry at one-pole and six-slot intervals, and the spatial order of the electromagnetic excitation force is as high as 8, so that vibration and noise can be greatly reduced. Here, the spatial order 8 of the electromagnetic excitation force is equal to a greatest common divisor of the pole number and the slot number.

In the motor with the pole number of 10 and the slot number of 9 disclosed in the conventional example, a greatest common divisor of the pole number and the slot number is 1, and therefore, in order to cause the spatial order of an electromagnetic excitation force to be 3 or higher, the pole number and the slot number need to be tripled, i.e., 30 poles and 27 slots, respectively.

Similarly, in the example in which the pole number is 20 and the slot number is 18, 30 poles and 27 slots are needed, and in the example in which the pole number is 22 and the slot number is 21, 44 poles and 42 slots are needed. In the consequent-pole type in which the pole number is 14 (the number of magnets is 7) and the slot number is 12, a greatest common divisor of the pole number and the slot number is 2. Therefore, in order to cause the spatial order of an electromagnetic excitation force to be 3 or higher, a consequent-pole type in which the pole number is 28 (the number of magnets is 14) and the slot number is 24 is needed.

In the motors of these conventional examples, M and Q satisfy M>Q, where M is the pole number of a rotor composed of permanent magnets and a rotor iron core, and Q is the number of slots in which armature windings are provided in a stator iron core. In such motors that satisfy this condition, a greatest common divisor of the pole number and the slot number is small. Therefore, the pole number needed in order to cause the spatial order of an electronic excitation force to be 3 or higher is excessively large.

If the pole number is large, the frequency becomes higher under the same rotation rate, and therefore load of computing (microcomputer) for control increases, resulting in high cost.

In addition, if the pole number is large, a value obtained by converting positional error of a rotational angle sensor into electrical angle becomes large, thereby causing a problem of increasing torque ripple, vibration, and noise.

However, in the configuration in FIG. 1, a small pole number may be used, so that an effect of reducing load of computing for control is obtained.

In addition, an electromagnetic excitation force of second or lower spatial order can be greatly reduced, whereby an effect of also greatly reducing vibration and noise is obtained.

Further, even if the rotor-side magnetomotive force includes a harmonic of fifth order or seventh order on an electrical-angle basis, a motor with small torque ripple, small vibration, and small noise can be obtained.

In the conventional examples, the pole number is large, the frequency is higher under the same rotation rate, and therefore load of computing (microcomputer) for control increases, resulting in high cost. However, in the configuration in FIG. 1, a small pole number may be used, so that load of computing for control is reduced.

In addition, since a small pole number can be used, a value obtained by converting positional error of a rotational angle sensor into electrical angle becomes small, whereby torque ripple, vibration, and noise can be reduced.

Further, reluctance torque is obtained, whereby torque during high-speed rotation can be increased.

Here, an effect obtained in the case of providing two inverters 102 as shown in FIG. 2 will be described.

In the case of providing two inverters, the capacitance and the heat dissipation area of the inverters increase, so that large current can be applied to the armature windings. That is, the rated current of the motor 10 can be increased. Therefore, in the case of designing a motor 10 with the same torque, the rated rotation rate can be increased by reduction of winding resistance.

Figure 13:
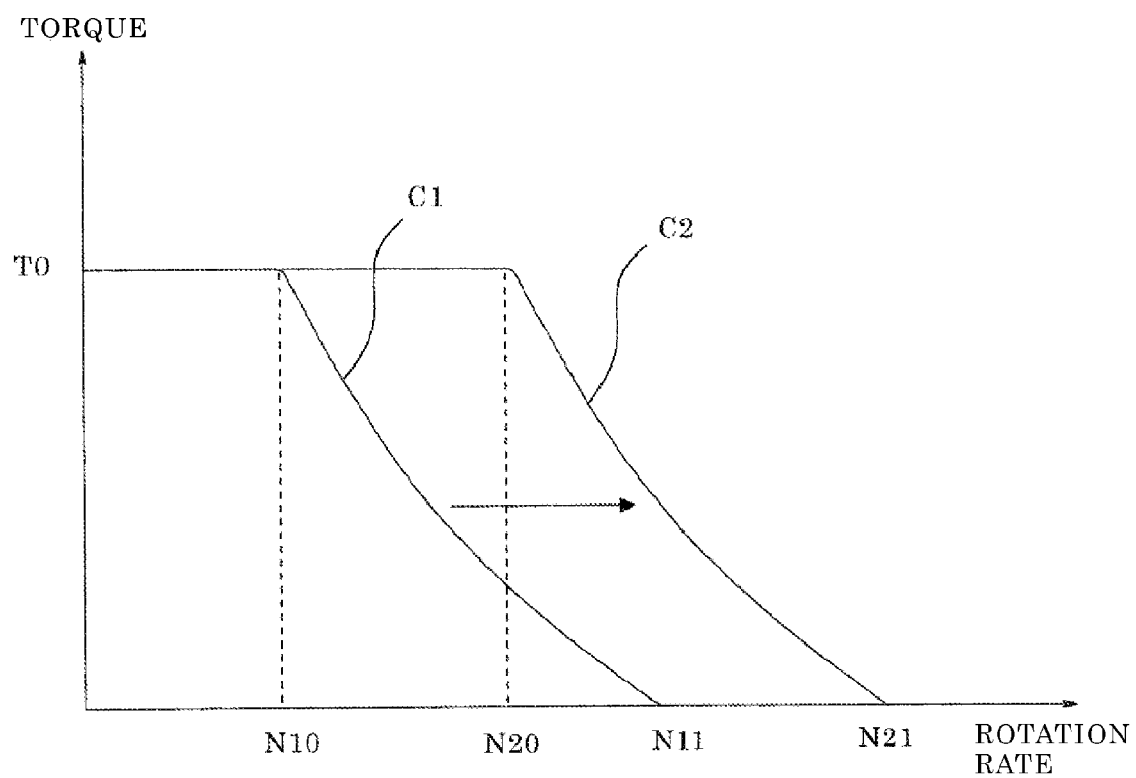
FIG. 13 is an explanation diagram showing a characteristic of torque relative to the rotation rate of a motor.

This will be described with reference to FIG. 13.

C1 indicates NT curve of a motor having a rated torque of T0 and driven by one inverter. The rated rotation rate is N10 and the no-load rotation rate is N11.

On the other hand, C2 indicates NT curve of a motor also having a rated torque of T0 but driven by two inverters, and having a larger rated current than that of the above motor driven by one inverter. Its rated rotation rate N20 is larger than N10, and thus high output can be realized. Its no-load rotation rate N21 is also larger than N11, and thus a motor having high torque even in a high rotation region can be obtained.

If the heat dissipation area increases by providing two inverters, temperature increase in the inverters can be suppressed even if a driver repeats steering for a long time. Therefore, a motor can continue to assist a steering force for a long time. This contributes to improvement in performance as an electric power steering apparatus.

In the permanent magnet motor 10 in FIG. 1, the shape of the permanent magnet 13 is planar. Therefore, an effect of improving material yield of permanent magnet and reducing the cost is obtained. A normal semi-cylindrical magnet has a thin portion, thereby causing a problem that demagnetization is likely to occur in such a portion. However, the planar magnet has a uniformed thickness, thereby providing an effect of suppressing demagnetization.

In addition, since the permanent magnet 13 is embedded in the rotor iron core 12, an effect is obtain that it becomes unnecessary to take a measure to prevent magnet scattering, such as providing a metallic cover made of SUS, aluminum, etc., thereby reducing the cost.

It is noted that although FIG. 1 shows the case where the planar permanent magnet 13 is embedded in the rotor iron core 12 and the width of the permanent magnet 13 in the circumferential direction is larger than the thickness thereof in the radial direction, the present invention is not limited thereto.

Figure 3:
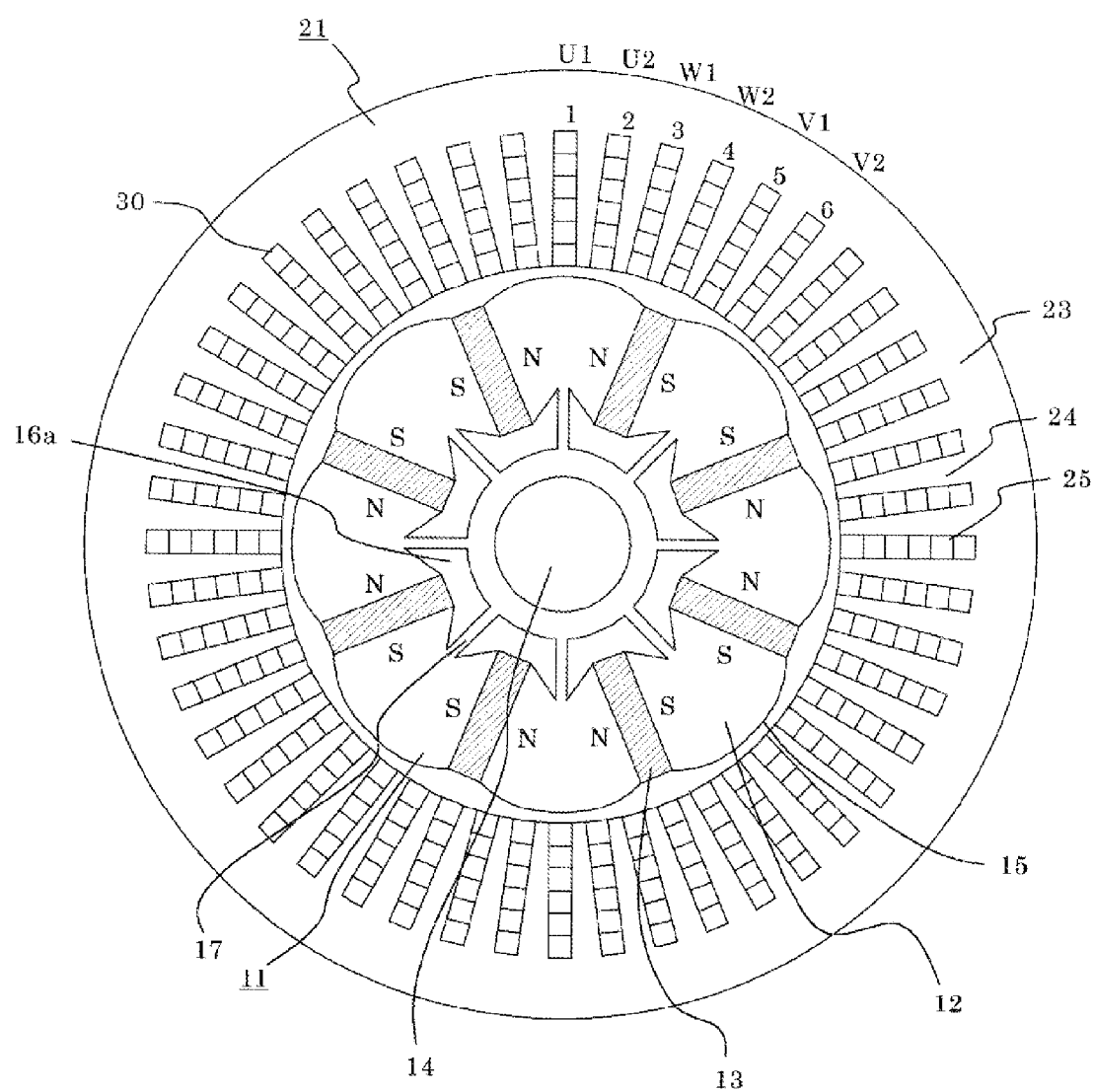
FIG. 3 is a sectional view showing another example of the permanent magnet motor of embodiment 1.

FIG. 3 shows another example of the permanent magnet motor 10, in which the permanent magnets 13 having a rectangular sectional shape and having a greater length in the radial direction than the length thereof in the circumferential direction are embedded in the rotor iron core 12. The magnetization directions of the permanent magnets 13 are such that N and S in FIG. 3 indicate N pole and S pole, respectively.

That is, the permanent magnets 13 are magnetized such that surfaces facing to each other of the adjacent permanent magnets 13 have the same pole. By thus setting the magnetization directions, an effect of converging magnetic flux on the rotor iron core 12 and thereby increasing the magnetic flux density is obtained.

In addition, the rotor iron core 12 is interposed between the adjacent permanent magnets 13. The rotor iron core 12 has a curved surface portion 15 on its surface facing to the stator 21 side. The shape of the curved surface portion 15 is formed to be such a convex curved surface that the gap length from the stator 21 is shortened toward the midpoint between the adjacent permanent magnets 13.

The outer side of the curved surface portion 15 in the radial direction protrudes toward the stator 21 side beyond a radius intermediate between the maximum outer radius and the minimum inner radius of the permanent magnet 13, which is defined in the same manner as in FIG. 1.

This shape smoothens the waveform of the magnetic flux density occurring in the gap, thereby reducing cogging torque and torque ripple.

Further, a non-magnetic portion 16*a* is provided in contact with an end surface of the permanent magnet 13 on the inner circumferential side. This portion may be air or may be filled with resin, or a non-magnetic metal such as stainless or aluminum may be interposed in this part.

Thus, flux leakage of the permanent magnet 13 can be reduced, whereby torque of the motor 10 can be increased.

A joint portion 17 is provided between the rotor iron core 12 between the adjacent permanent magnets 13 and the rotor iron core 12 provided so as to surround the outer circumference of the shaft 14. The joint portion 17 functions to mechanically join both rotor iron cores 12.

In the above example, the length of the permanent magnet 13 in the radial direction is longer than the length in the circumferential direction, magnetic flux is converged on the rotor iron core 12, resulting in high torque.

Conventionally, a structure in which the permanent magnet 13 is embedded in the rotor iron core 12 has a problem that torque ripple increases and vibration and noise increase as compared to the case of surface magnet type. However, by driving with the two three-phase inverters shown in FIG. 2 such that the phase difference between the armature windings 30-1 and the armature windings 30-2 is an electrical angle of 20 to 40 degrees, or desirably, an electrical angle of 30 degrees, the sixth order torque ripple can be reduced.

In addition, as in the case of FIG. 1, the spatial order of the electromagnetic excitation force is as high as 8, so that vibration and noise can be greatly reduced.

Although the case where the slot number for each pole for each phase is 2 has been shown in FIGS. 1 and 3, the slot number is not limited thereto.

Figure 5:
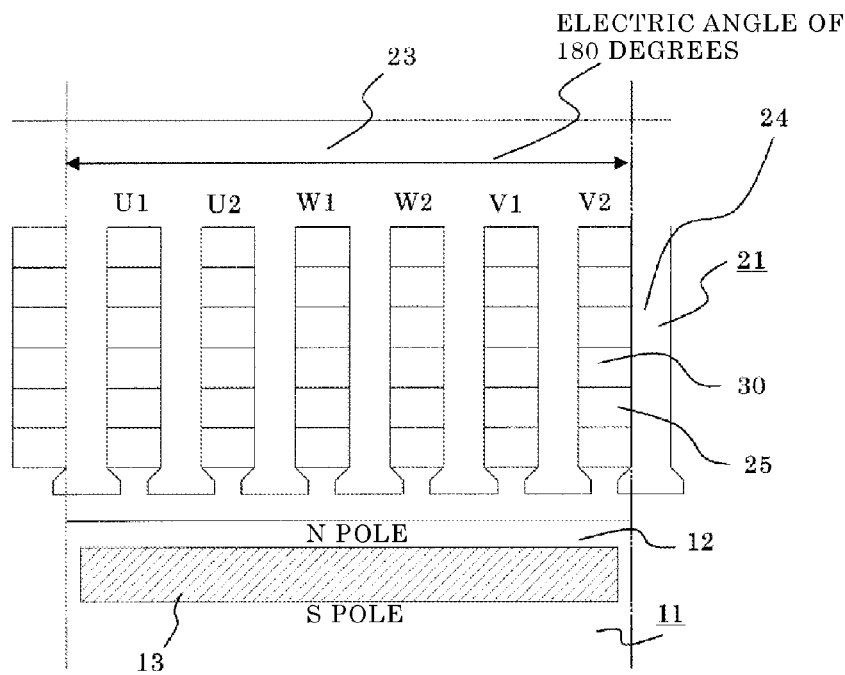
FIG. 5 is a schematic explanation diagram of placements of armature windings of the permanent magnet motor of embodiment 1.
Figure 5:
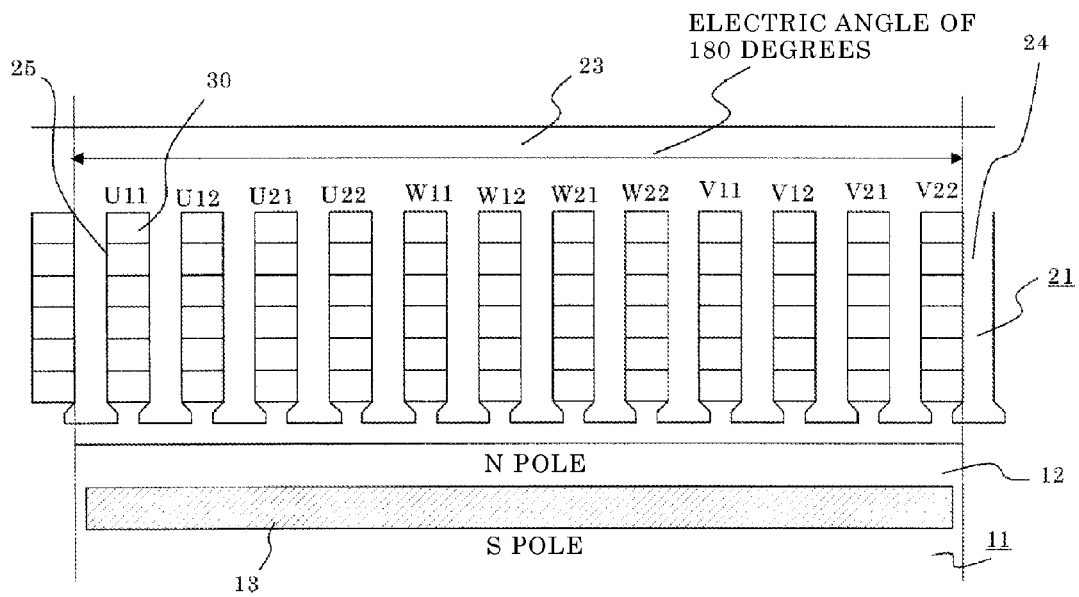

Although FIG. 5(*a*) shows an example in which the slot number for each pole for each phase is 2, the slot number for each pole for each phase may be 4 as shown in FIG. 5(*b*).

In FIG. 5(*b*), the armature windings 30 are arranged in the order, U11, U12, U21, U22, W11, W12, W21, W22, V11, V12, V21, V22. Among these, U11, U12, W11, W12, V11, and V12 indicate armature windings for the first inverter 102-1, and U21, U22, W21, W22, V21, and V22 indicate armature windings for the second inverter 102-2.

In the case where the slot number for each pole for each phase is an even number equal to or greater than 4, harmonics of the armature winding magnetomotive force are reduced, whereby an effect of further reducing torque ripple is obtained.

Here, the reason for employing an even number is that two sets of armature windings are needed for driving by two inverters.

Generally, if the value of Q/(3M) which is the slot number for each pole for each phase is an integer, and further, the value of Q/(3M) is an even number equal to or greater than 2, magnetomotive force harmonics caused by the armature windings do not include an even-number order component (in the case where a component having an electrical angle cycle of 360 degrees is defined as first order), and therefore, torque ripple does not occur even if a magnetomotive force on the rotor 11 includes even-number order harmonics (in the case where a component having an electrical angle cycle of 360 degrees is defined as first order), so that a motor with small torque ripple, small vibration, and small noise can be obtained.

Further, another effect in the case where Q/(3M) is an even number equal to or greater than 2 is that the slot pitch becomes an electrical angle of 30 degrees or smaller, whereby structuring of two sets of three-phase armature windings is facilitated.

Embodiment 2

Figure 4:
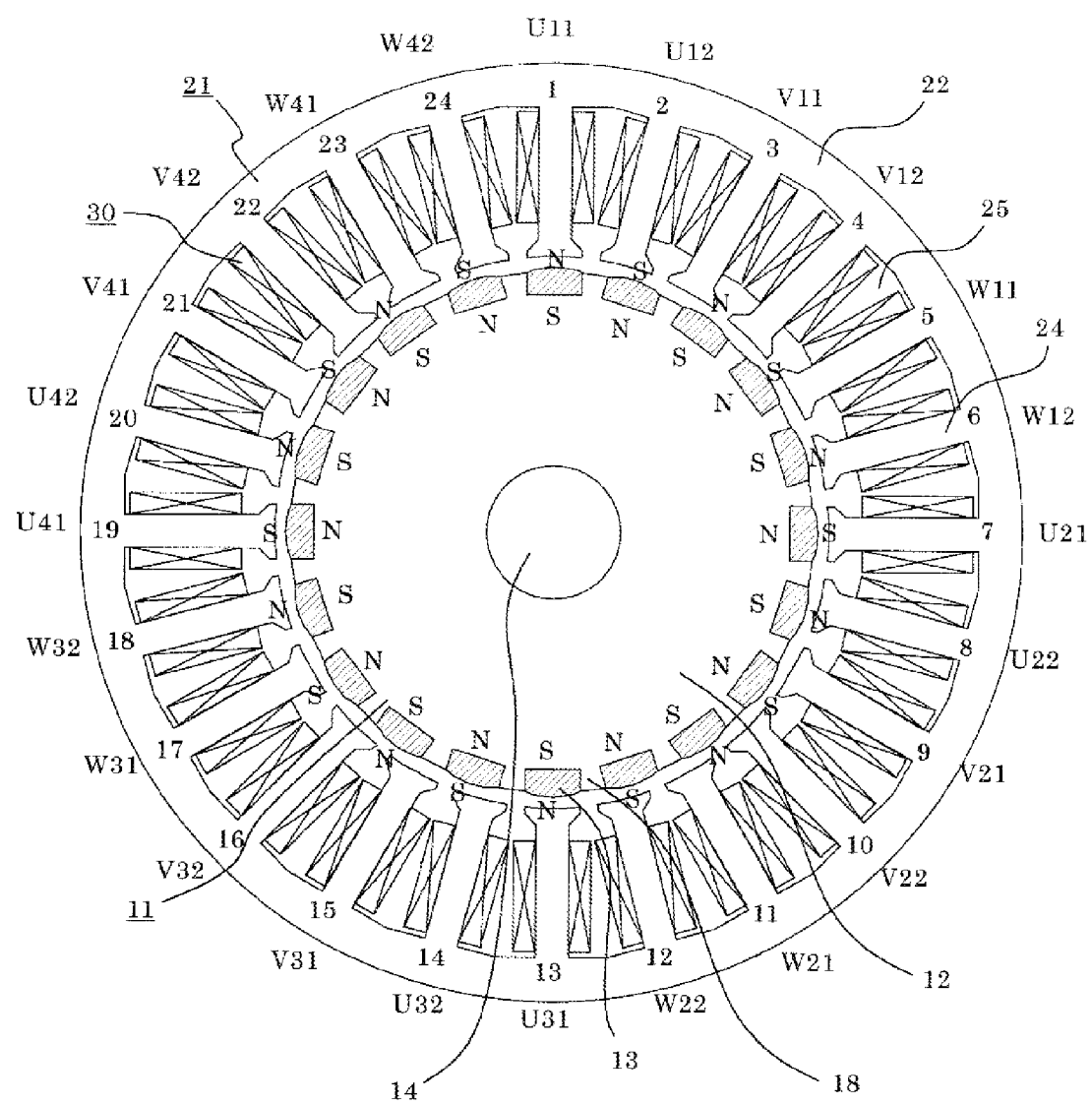
FIG. 4 is a sectional view showing a permanent magnet motor of embodiment 2.

FIG. 4 is an explanation diagram of a cross-section of a permanent magnet motor 10 of embodiment 2, showing an example in which concentrated winding is employed and 20 poles and 24 slots are provided.

A rotor 11 is rotatably provided inside a stator 21, and has a shaft 14, a rotor iron core 12 provided outside the shaft 14, and twenty permanent magnets 13 provided at regular intervals around the outer circumference of the rotor iron core 12.

The stator 21 has a ring-shaped core back 23, a total of twenty-four teeth 24 extending radially inward from the core back 23, a stator iron core 22 in which a slot 25 is provided between the adjacent two teeth 24, and an armature winding 30 wound on each tooth 24 in a concentrated manner.

It is noted that in FIG. 4, for the purpose of simplification, an insulator provided between the armature winding 30 and the stator iron core 22, and a frame provided on the outer circumference of the stator iron core 22, are not shown. In addition, for convenience sake, numbers of 1 to 24 are assigned to the teeth 24. Further, for convenience sake, numbers are assigned to the armature windings (coils) 30 wound on the respective teeth 24 in a concentrated manner, in order to identify three phases of U, V, and W of the coils.

The phases of U, V, and W respectively include eight U phases of U11, U12, U21, U22, U31, U32, U41, and U42, eight V phases of V11, V12, V21, V22, V31, V32, V41, and V42, and eight W phases of W11, W12, W21, W22, W31, W32, W41, and W42. As shown in FIG. 4, the coils are arranged in the order, U11, U12, V11, V12, W11, W12, U21, U22, V21, V22, W21, W22, U31, U32, V31, V32, W31, W32, U41, U42, V41, V42, W41, W42, so as to correspond to the respective teeth.

In addition, regarding the winding directions of the windings, U11 and U12 are opposite to each other, U21 and U22 are opposite to each other, U31 and U32 are opposite to each other, and U41 and U42 are opposite to each other. The winding directions of the other phases V and W are also configured in the same manner. These coils are connected in a Y-connection fashion or in a Δ-connection fashion to form two sets of three-phase armature windings 30.

Of the two sets of armature windings, first armature windings 30-1 are composed of U11, U21, U31, U41, V11, V21, V31, V41, W11, W21, W31, and W41, and second armature windings 30-2 are composed of U12, U22, U32, U42, V12, V22, V32, V42, W12, W22, W32, and W42.

The armature windings 30-1 and the armature windings 30-2 are connected to two inverters 102-1 and 102-2, respectively, as shown in FIG. 2.

A protruding portion 18 is present between the adjacent permanent magnets 13 of the rotor 11. The protruding portion 18 is made of magnetic material as in the rotor iron core 12. In addition, the outer side of the protruding portion 18 in the radial direction protrudes toward the stator 21 side beyond a radius intermediate between the maximum outer radius and the minimum inner radius of the permanent magnet 13, which is defined in the same manner as in FIG. 1.

In such a configuration, reluctance torque can be obtained by using change in the magnetic resistance of the rotor iron core 12. In a motor causing reluctance torque, a d-axis inductance is large and therefore flux weakening control is effectively exerted, whereby torque during high-speed rotation is improved.

However, since the rotor iron core 12 is present near the stator 21, a magnetic gap length is small as compared to the case of surface-magnet type. Therefore, magnetomotive force harmonics caused on the rotor 11 side include larger amounts of fifth and seventh components (in the case where a component having an electrical angle cycle of 360 degrees is defined as first order), whereby an electromagnetic excitation force and torque ripple tend to increase. In the case where Q is the number of the slots 25 in which the armature windings 30 are provided in the stator iron core 22, M and Q satisfy a relationship of M<Q, and a greatest common divisor of M and Q is 4. Therefore, the spatial order of the electromagnetic excitation force becomes 4, so that vibration and noise are reduced.

Also in the present embodiment, when three-phase currents are made to flow in the armature windings 30-1 and the armature windings 30-2 by the first inverter 102-1 and the second inverter 102-2, if the phase difference between the armature windings 30-1 and the armature windings 30-2 is set to be an electrical angle of 20 to 40 degrees, or desirably, an electrical angle of 30 degrees, a sixth order component (in the case where a component having an electrical angle cycle of 360 degrees is defined as first order) of torque ripple is greatly reduced.

The reason is as follows. That is, even if magnetomotive force harmonics caused on the rotor 11 side include fifth order and seventh order components (in the case where a component having an electrical angle cycle of 360 degrees is defined as first order), the fifth order and seventh order components disappear or are greatly reduced in a magnetomotive force waveform on the armature side by changing the phases of currents in the armature windings 30-1 and the armature windings 30-2.

This phase difference may be changed in accordance with the driving state of the motor, or may be fixed at an electrical angle of 30 degrees, for example.

Embodiment 3

Figure 6:
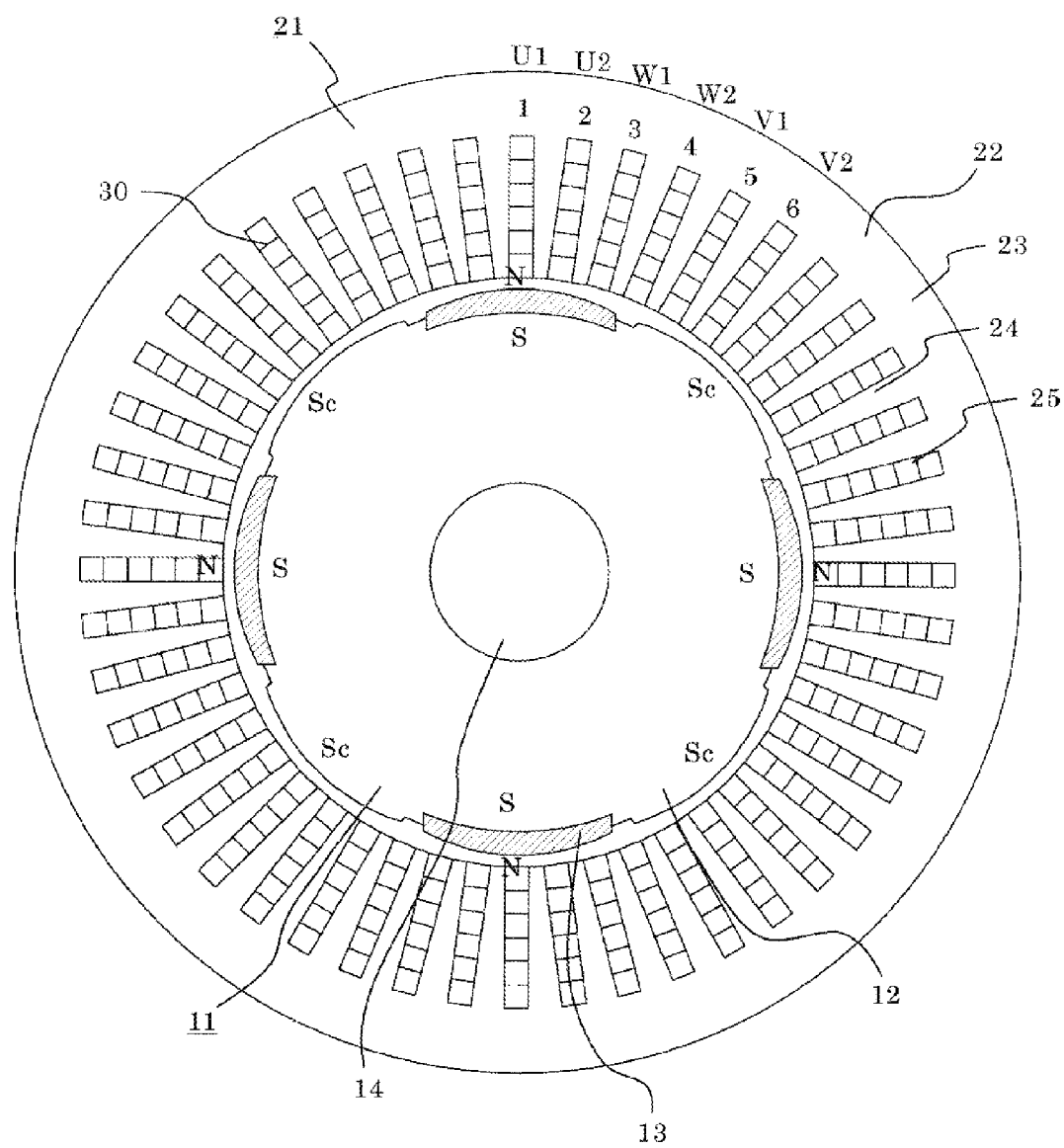
FIG. 6 is a sectional view showing a permanent magnet motor of embodiment 3 of the present invention.

FIG. 6 is an example of a consequent-pole motor 10 of surface-magnet type with a stator 21 of distributed winding type and with 8 poles and 48 slots.

The stator 21 is the same as in FIG. 1, that is, the stator 21 has a stator iron core 22 provided with a core back 23, teeth 24, and slots 25, and armature windings 30 provided in the slots 25.

Regarding the arrangement of the armature windings 30, the armature windings 30 indicated by U1, U2, W1, W2, V1, and V2 are respectively provided in the slots 25 indicated by 1 to 6 in FIG. 6. Similarly, also for the seventh to forty-eighth slots 25, the pattern of U1, U2, W1, W2, V1, and V2 is repeated seven times. It is noted that the direction of current flow is inverted between windings at positions separated from each other by 6 slots.

Here, U1, U2, W1, W2, V1, and V2 indicate that there are two sets of three-phase armature windings 30, and specifically, the first U-phase winding is U1, the second U-phase winding is U2, the first V-phase winding is V1, the second V-phase winding is V2, the first W-phase winding is W1, and the second W-phase winding is W2.

U1, V1, and W1 form first armature windings 30-1, which are connected to a first inverter 102-1, and U2, V2, and W2 form second armature windings 30-2, which are connected to a second inverter 102-2.

The rotor 11 is different from that in FIG. 1, that is, four permanent magnets 13 are arranged along the circumferential direction, and the magnetization directions are such that N and S in FIG. 6 indicate N pole and S pole, respectively.

That is, the four permanent magnets 13 are all magnetized in the same direction. The rotor iron core 12 is present between the permanent magnets 13, and a portion indicated as a salient pole Sc corresponds to an S pole of a normal motor.

In addition, the outer side of the salient pole Sc in the radial direction protrudes toward the stator 21 side beyond a radius intermediate between the maximum outer radius and the minimum inner radius of the permanent magnet 13, which is defined in the same manner as in FIG. 1.

Figure 7:
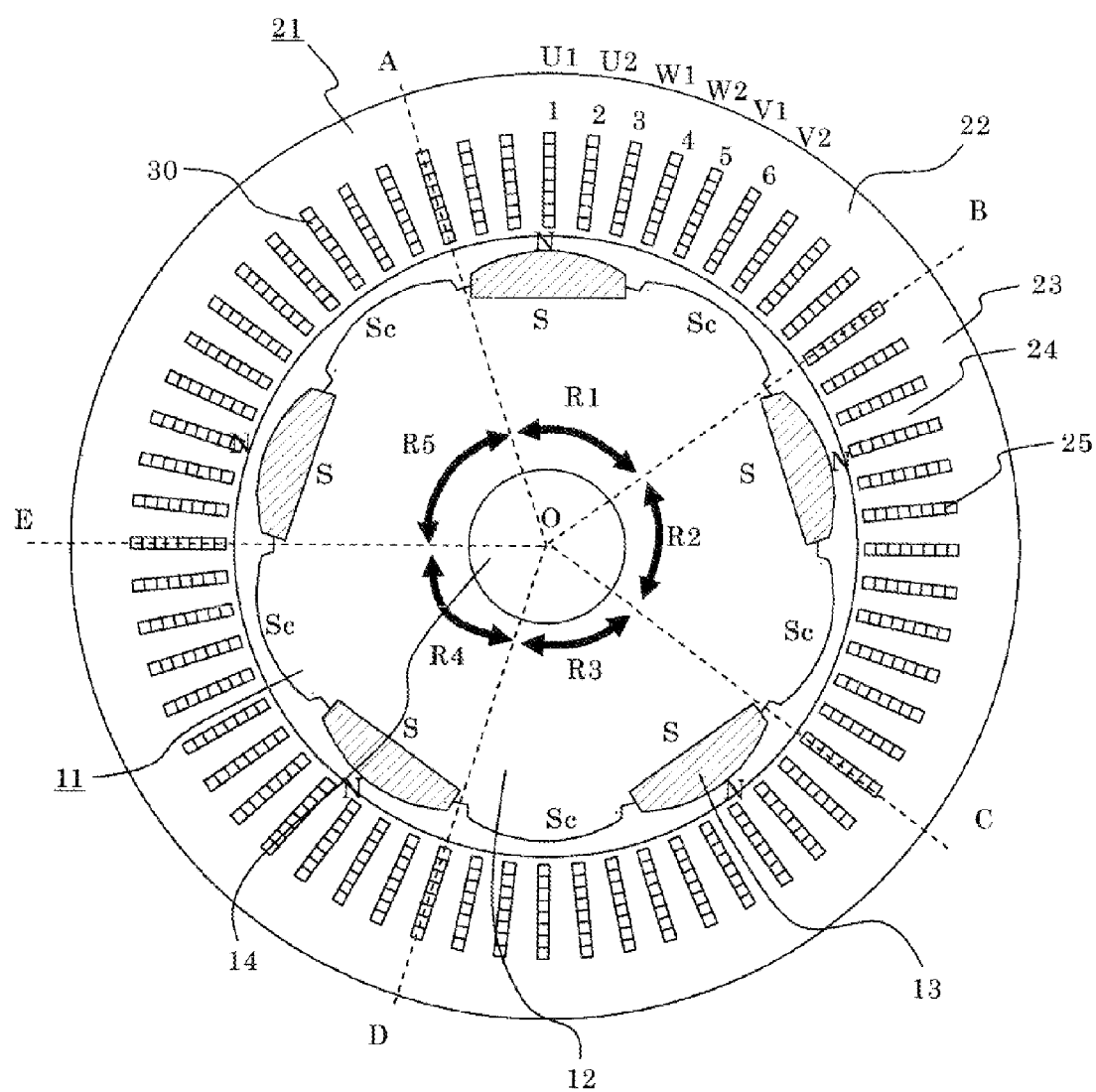
FIG. 7 is a sectional view showing another example of the permanent magnet motor of embodiment 3.

FIG. 7 is an example of a consequent-pole motor 10 of surface-magnet type with 10 poles and 60 slots. The armature windings 30 indicated by U1, U2, W1, W2, V1, and V2 are respectively provided in the slots 25 indicated by 1 to 6 in FIG. 7. Similarly, also for the seventh to sixtieth slots 25, the pattern of U1, U2, W1, W2, V1, and V2 is repeated nine times. It is noted that the direction of current flow is inverted between windings at positions separated from each other by 6 slots.

Here, U1, U2, W1, W2, V1, and V2 indicate that there are two sets of three-phase armature windings 30, and specifically, the first U-phase winding is U1, the second U-phase winding is U2, the first V-phase winding is V1, the second V-phase winding is V2, the first W-phase winding is W1, and the second W-phase winding is W2.

U1, V1, and W1 form first armature windings 30-1, which are connected to a first inverter 102-1, and U2, V2, and W2 form second armature windings 30-2, which are connected to a second inverter 102-2.

In the example in which the pole pair number is an odd number disclosed in Patent Document 3, that is, in the consequent-pole type in which the pole number is 14 (the number of magnets is 7) and the slot number is 12, the magnetic circuit is not rotationally symmetric, and therefore an electromagnetic excitation force of first spatial order occurs, resulting in a problem of increasing vibration and noise on an electric power steering apparatus.

However, the structures in FIGS. 6 and 7 cause no electromagnetic excitation force of a low spatial order in spite of the consequent-pole type. The principle will be described.

The rotors 11 in FIGS. 6 and 7 are formed in a consequent-pole type, and configured to have a periodicity on a 2-pole basis (corresponding to an electrical angle of 360 degrees) on the rotor 11 side.

On the other hand, the stator 21 is configured to have a periodicity on a 6-slot basis (corresponding to an electrical angle of 180 degrees) as described above. It is noted that since currents in opposite directions flow in armature windings 30 at positions separated by an electrical angle of 180 degrees, the periodicity is such that the direction of the magnetic flux density inverts.

In view of the above description and the fact that an electromagnetic force is proportional to the square of the magnetic flux density, the electromagnetic force has a periodicity on a 2-pole basis which corresponds to an electrical angle of 360 degrees.

Therefore, if electromagnetic forces in regions R1, R2, R3, R4, and R5 between lines OA, OB, OC, OD, and OE connecting the rotation center O and a total of five points A, B, C, D, and E at electrical angle intervals of 360 degrees in FIG. 7 are summed, they are balanced, so that an electromagnetic excitation force of first spatial order does not occur.

Further, since the electromagnetic force has a periodicity on a 2-pole basis which corresponds to an electrical angle of 360 degrees, the spatial order of an electromagnetic excitation force is 5.

Thus, in the structure of the present embodiment, an electromagnetic excitation force of third or lower spatial order does not occur in spite of a consequent-pole type with an odd pole pair number, and therefore a motor with small vibration and small noise is obtained.

In addition, in FIGS. 6 and 7, the permanent magnet 13 is provided at the surface of the rotor iron core 12, and therefore flux leakage to an iron core is reduced, whereby an effect of enhancing usage efficiency of magnetic flux of the permanent magnets 13 is obtained. In the consequent-pole type, an effect of reducing the component number of the permanent magnets 13 is obtained.

As described above, in embodiment 3, a M/2 number of permanent magnets 13 are arranged along the circumferential direction of the rotor 11 in the case where M is the pole number of the rotor 11, and the permanent magnets 13 are provided at the surface of the rotor iron core 12, so that effects are obtained that the component number is reduced, usage efficiency of magnets is improved by reduction in flux leakage, reduction in torque ripple, vibration, and noise is realized even if a magnetomotive force waveform on the rotor side includes an even-number order component.

Embodiment 4

Embodiment 3 has shown an example in which the consequent-pole type is employed and permanent magnets are provided at the surface of the rotor iron core 12. However, an IPM (Interior Permanent Magnet) type may be employed in which permanent magnets are embedded in the rotor iron core 12.

Figure 10:
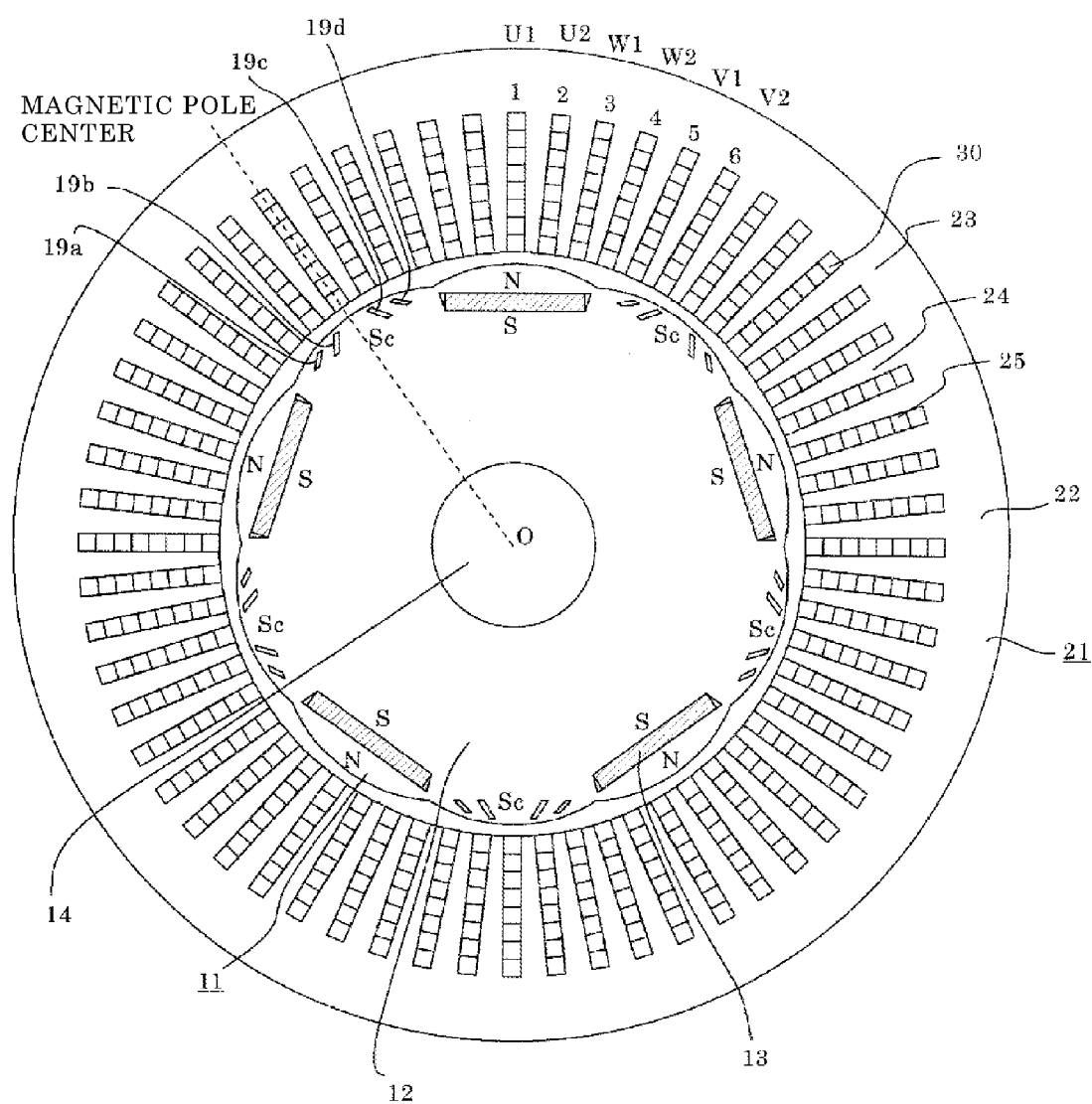
FIG. 10 is a sectional view showing a permanent magnet motor of embodiment 4 of the present invention.

FIG. 10 shows an example of an IPM with 10 poles and 60 slots in which the stator 21 is of a distributed winding type and the rotor 11 is of a consequent-pole type. The armature windings 30 indicated by U1, U2, W1, W2, V1, and V2 are respectively provided in the slots 25 indicated by 1 to 6 in FIG. 10. Similarly, also for the seventh to sixtieth slots 25, the pattern of U1, U2, W1, W2, V1, and V2 is repeated nine times. It is noted that the direction of current flow is inverted between windings at positions separated from each other by 6 slots.

Here, U1, U2, W1, W2, V1, and V2 indicate that there are two sets of three-phase armature windings 30, and specifically, the first U-phase winding is U1, the second U-phase winding is U2, the first V-phase winding is V1, the second V-phase winding is V2, the first W-phase winding is W1, and the second W-phase winding is W2.

U1, V1, and W1 form first armature windings 30-1, which are connected to a first inverter 102-1, and U2, V2, and W2 form second armature windings 30-2, which are connected to a second inverter 102-2.

In the rotor 11, a M/2 number of, i.e., five planar permanent magnets 13 are arranged along the circumferential direction in the case where M is the pole number of the rotor 11, and the permanent magnets 13 are embedded in the rotor iron core 12. Regarding polarities, the permanent magnets 13 are magnetized such that N and S in FIG. 6 indicate N pole and S pole, respectively. A salient pole Sc of the rotor iron core 12 provided between the permanent magnets 13 serves the same role as an S pole of a normal motor.

Thus, in the consequent-pole type, an N pole and a salient pole Sc due to the permanent magnet 13 are magnetically asymmetric. For understanding of this magnetic asymmetry, FIGS. 8 and 9 show magnetomotive force waveforms and results of frequency analysis thereof, in which the order of a component having an electrical angle cycle of 360 degrees is defined as first order.

Figure 8:
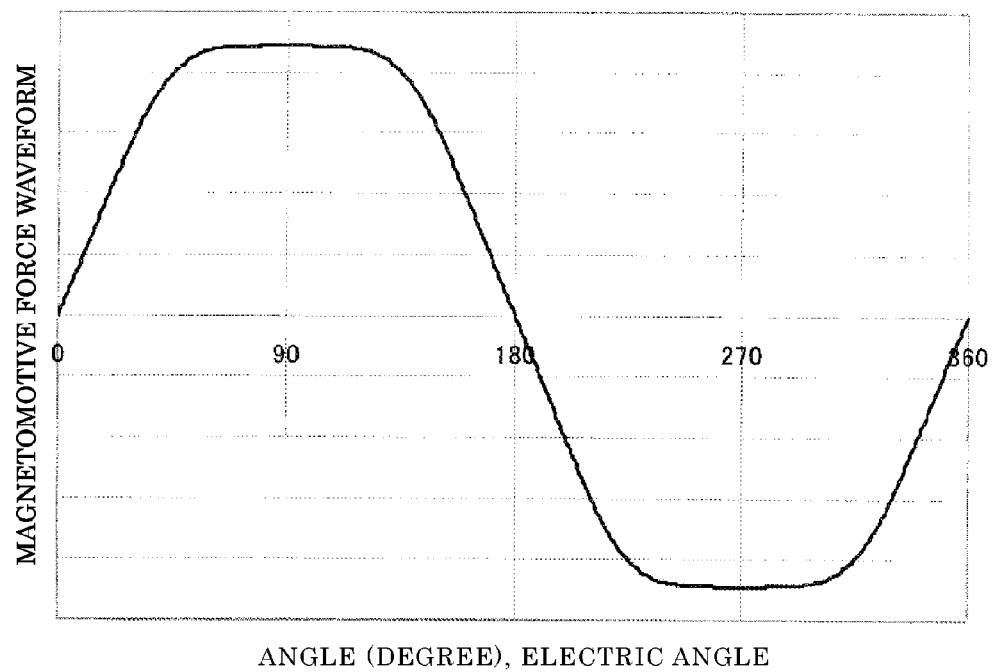
FIG. 8 is a diagram showing a magnetomotive force waveform of a rotor of a normal motor, and a frequency analysis result thereof.
Figure 8:
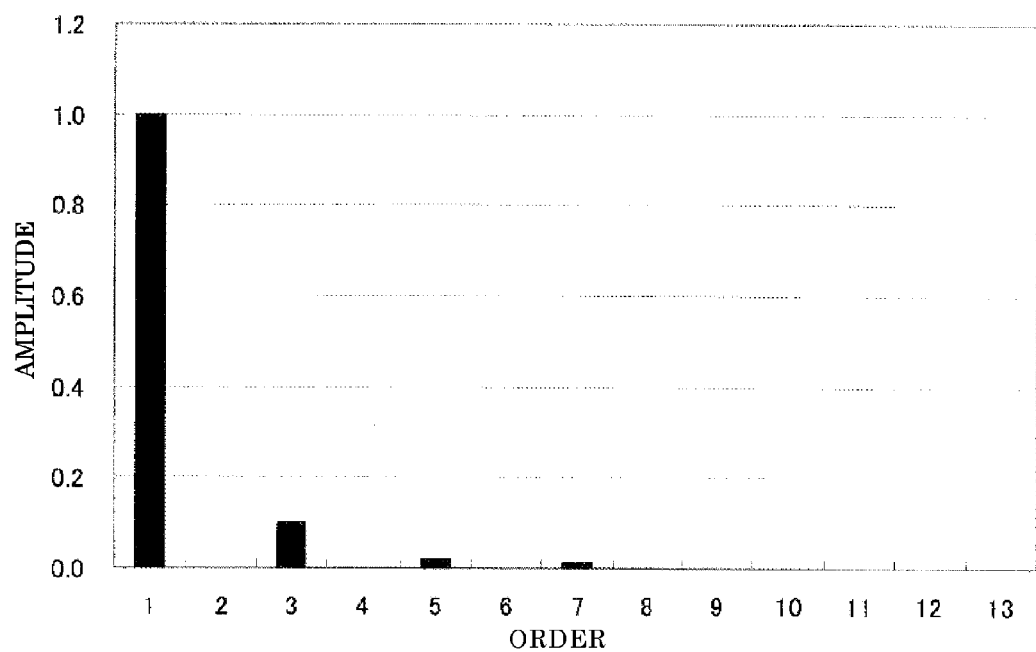
Figure 9:
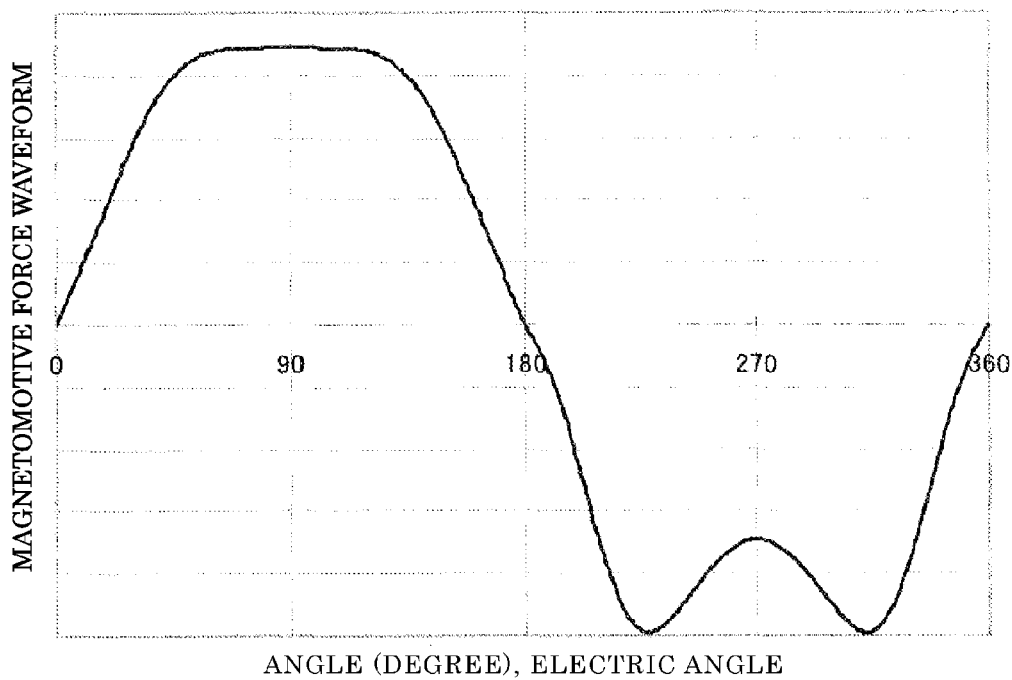
FIG. 9 is a diagram showing a magnetomotive force waveform of a rotor of a consequent-pole motor, and a frequency analysis result thereof.
Figure 9:
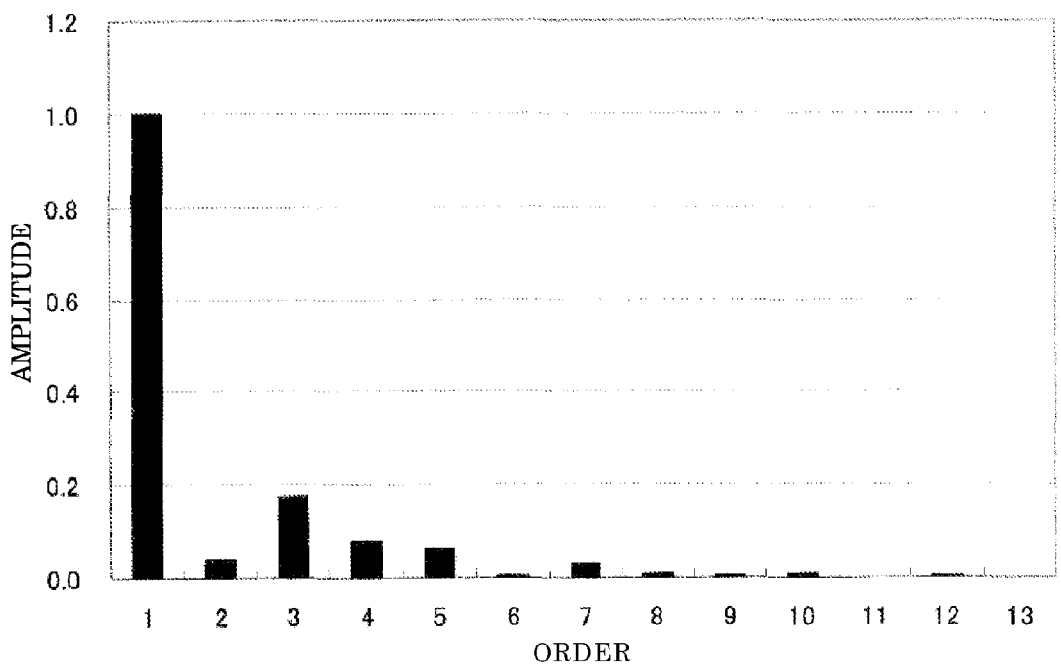

An upper diagram in FIG. 8 is a magnetomotive force waveform of a rotor of a normal motor in which both an N pole and an S pole are formed by the permanent magnet 13. A lower diagram in FIG. 8 is a frequency analysis result thereof. The waveform has symmetry in which positive and negative are inverted between an electrical angle range of 0 to 180 degrees and an electrical angle range of 180 to 360 degrees. In this case, only odd-number order harmonics are included (lower diagram).

On the other hand, in the case of consequent-pole type, the waveform is not symmetric between an N pole and a salient pole Sc (or in another case, an S pole and a salient pole Nc corresponding to an N pole of a normal motor). An upper diagram in FIG. 9 shows a magnetomotive force waveform of a rotor of consequent-pole type, and a lower diagram shows a frequency analysis result thereof. It is found that since the magnetomotive force waveform is asymmetric, harmonics of even-number orders such as second order and fourth order are included. In a conventional configuration, there is a problem that if a magnetomotive force waveform of a rotor includes even-number order harmonics, cogging torque and torque ripple increase, so that such a configuration is not suitable for a motor for electric power steering apparatus.

However, unlike the case of concentrated winding in Patent Document 3, in the configuration of the present embodiment shown in FIG. 10, the armature windings 30 are wound in a distributed manner, and the armature windings 30 of U1, U2, W1, W2, V1, and V2 are provided in the slots 25 indicated by 1 to 6, respectively. Similarly, also for the seventh to sixtieth slots 25, the pattern of U1, U2, W1, W2, V1, and V2 is repeated nine times. It is noted that the direction of current flow is inverted between windings at positions separated from each other by 6 slots. In such a configuration, no magnetomotive force harmonic of even-number order appears in principle.

Therefore, as in embodiment 3, effects are obtained that the component number is reduced, usage efficiency of magnets is improved by reduction in flux leakage, reduction in torque ripple, vibration, and noise is realized even if a magnetomotive force waveform on the rotor side includes an even-number order component.

Further, slits 19a to 19d are provided in the rotor iron core 12 in FIG. 10. Their shapes are symmetric with respect to a magnetic pole center indicated by a dotted line, and the slits approach the magnetic pole center as approaching the outer circumferential side of the rotor 11.

Such shapes provide an effect of converging magnetic flux on the magnetic pole center, thereby improving torque, and at the same time, provide an effect of reducing asymmetry of the magnetomotive force waveform shown in FIG. 9 so that the magnetomotive force waveform at the salient pole comes close to the magnetomotive force waveform at the magnetic pole of the permanent magnet 13.

That is, an effect of reducing even-number order harmonics in FIG. 9 is obtained, whereby an effect of reducing cogging torque and torque ripple is obtained.

FIG. 10 has shown an example in which four slits are provided for each salient pole Sc. However, as a matter of course, the number of slits is not limited thereto, and the same effect is obtained even in the case of providing four or less slits or providing six or more slits.

Embodiment 5

Figure 11:
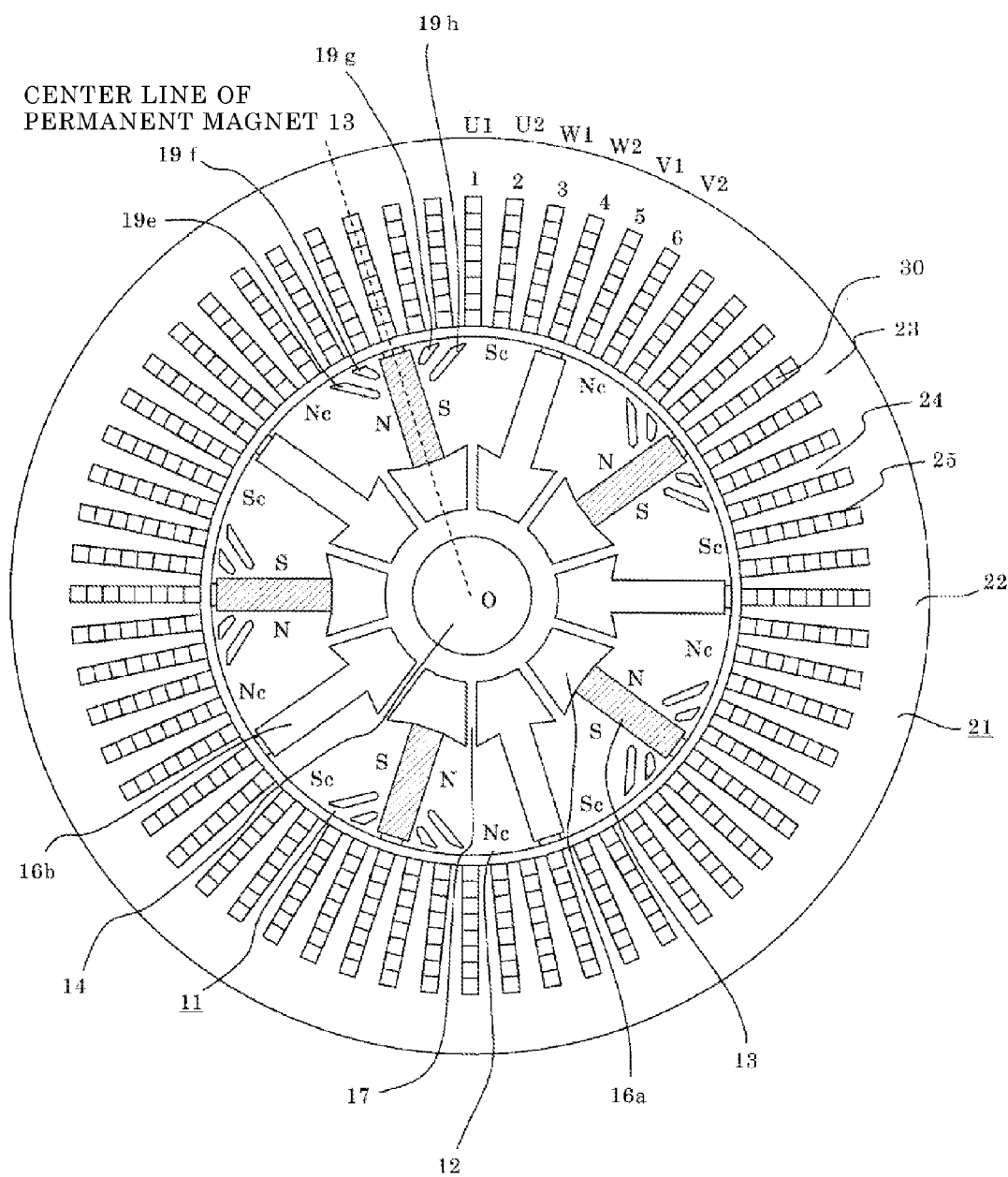
FIG. 11 is a sectional view showing a permanent magnet motor of embodiment 5 of the present invention.

FIG. 11 is another example of the arrangement of the permanent magnets 13 and the shape of the rotor iron core 12 in the configuration in FIG. 3. The rotor 11 is rotatably provided inside the stator 21. The rotor 11 is provided with the shaft 14 as a rotational shaft, and the rotor iron core 12 outside the shaft 14.

The permanent magnets 13 have a rectangular sectional shape having a greater length in the radial direction than the length thereof in the circumferential direction. A M/2 number of, i.e., five permanent magnets 13 are arranged at regular intervals along the circumferential direction in the case where M is the pole number of the rotor 11.

The magnetization directions of the permanent magnets 13 are such that N and S in FIG. 11 indicate N pole and S pole, respectively. That is, the surfaces facing to each other of the adjacent permanent magnets 13 are magnetized to have different polarities.

Further, a non-magnetic portion 16b is provided between the adjacent permanent magnets 13. The non-magnetic portion 16b may be air or may be filled with resin, or a non-magnetic metal such as stainless or aluminum may be interposed in this part. By setting the magnetization direction as described above and further providing the non-magnetic portion 16b, an effect is obtained that magnetic flux is converged on the rotor iron core 12, thereby increasing the magnetic flux density.

In addition, the rotor iron core 12 is present on both sides in the circumferential direction of the permanent magnet 13. In accordance with the magnetization direction of the permanent magnet 13, the salient pole Nc forms a magnetic pole corresponding to an N pole, and the salient pole Sc forms a magnetic pole corresponding to an S pole. Therefore, the rotor 11 operates as a rotor with 10 poles.

The outer sides of the salient poles Nc and Sc in the radial direction protrude toward the stator 21 side beyond a radius intermediate between the maximum outer radius and the minimum inner radius of the permanent magnet 13, which is defined in the same manner as in FIG. 1.

Further, a non-magnetic portion 16a is provided in contact with end surfaces of the permanent magnet 13 and the non-magnetic portion 16b on the inner circumferential side. This portion may be air or may be filled with resin, or a non-magnetic metal such as stainless or aluminum may be interposed in this part.

Thus, flux leakage of the permanent magnet 13 can be reduced, whereby torque of the motor 10 can be increased. A joint portion 17 is provided between the rotor iron core 12 between the adjacent permanent magnets 13 and the rotor iron core 12 provided so as to surround the outer circumference of the shaft 14. The joint portion 17 functions to mechanically join both rotor iron cores 12.

Such a rotor structure conventionally has a problem that, since the number of the permanent magnets 13 is reduced by half, distribution of the magnetic flux density is uneven as compared to the structure of the rotor shown in FIG. 3, resulting in increase in torque ripple.

Besides, since the stator iron core 22 has a closed slot structure, there is a problem that increase in the torque ripple is also caused by magnetic saturation of the iron core due to flux leakage between the teeth 24.

However, according to the configuration of the present embodiment, by driving with the two three-phase inverters as shown in FIG. 2 such that the phase difference between the armature windings 30-1 and the armature windings 30-2 is an electrical angle of 20 to 40 degrees, or desirably, an electrical angle of 30 degrees, the sixth order component of torque ripple is greatly reduced.

Further, slits 19e to 19h are provided in the rotor iron core 12. These slits are provided at all magnetic poles. In addition, the slits 19e to 19h are located symmetrically with respect to the center line of the permanent magnet 13 indicated by a dotted line passing through the rotation center O in FIG. 11.

Further, the shapes of the slits are such that the slits become away from the center line of the permanent magnet 13 as approaching the outer side in the radial direction of the rotor 11.

Such shapes provide an effect of guiding magnetic flux to the salient pole Nc side and the salient pole Sc side to converge the magnetic flux on the vicinity of the salient pole Nc and the salient pole Sc, thereby improving torque of the motor 10.

Further, by forming the rotor iron core 12 in the vicinity of the salient pole Nc and the salient pole Sc into a shape not being rotationally symmetric, even-number order components of magnetomotive force harmonics due to asymmetry shown in FIG. 9 which cause a problem in the case of consequent-pole type, can be reduced, whereby an effect of reducing cogging torque and torque ripple is obtained.

In addition, the armature windings 30 are the same as in FIG. 10. In this configuration of the armature windings 30, as described in embodiment 4, no magnetomotive force harmonics of even-number orders appear in a magnetomotive force of the armature winding 30 in principle. Therefore, naturally, an effect is obtained that even if magnetomotive force harmonics of even-number orders are present on the rotor 11 side, torque ripple hardly increases.

FIG. 11 has shown an example in which a total of four slits are provided on both sides of each permanent magnet 13. However, as a matter of course, the number is not limited thereto, and the same effect is obtained even in the case of providing four or less slits or providing six or more slits.

Figure 12:
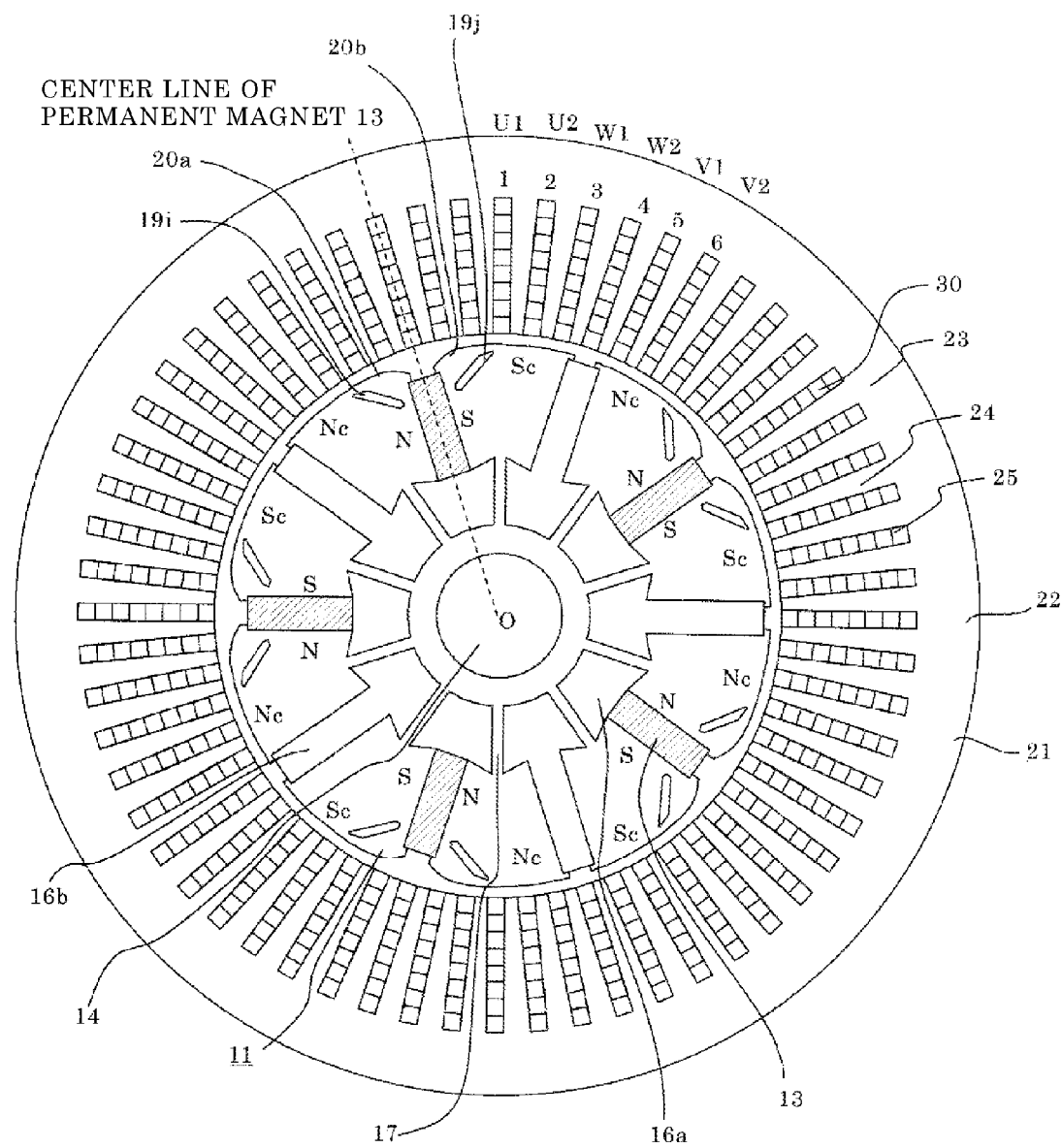
FIG. 12 is a sectional view showing another example of the permanent magnet motor of embodiment 5.

FIG. 12 is another example of the arrangement of the permanent magnets 13 and the shape of the rotor iron core 12 in the configuration in FIG. 3. The rotor 11 is rotatably provided inside the stator 21. The rotor 11 is provided with the shaft 14 as a rotational shaft, and the rotor iron core 12 outside the shaft 14.

The permanent magnets 13 have a rectangular sectional shape having a greater length in the radial direction than the length thereof in the circumferential direction. Five of the permanent magnets 13 are arranged at regular intervals along the circumferential direction.

The magnetization directions of the permanent magnets 13 are such that N and S in FIG. 12 indicate N pole and S pole, respectively. That is, the surfaces facing to each other of the adjacent permanent magnets 13 are magnetized to have different polarities.

Further, a non-magnetic portion 16b is provided between the adjacent permanent magnets 13. The non-magnetic portion 16b may be air or may be filled with resin, or a non-magnetic metal such as stainless or aluminum may be interposed in this part. By setting the magnetization direction as described above and further providing the non-magnetic portion 16b, an effect is obtained that magnetic flux is converged on the rotor iron core 12, thereby increasing the magnetic flux density.

In addition, the rotor iron core 12 is present on both sides in the circumferential direction of the permanent magnet 13. In accordance with the magnetization direction of the permanent magnet 13, the salient pole Nc forms a magnetic pole corresponding to an N pole, and the salient pole Sc forms a magnetic pole corresponding to an S pole. Therefore, the rotor 11 operates as a rotor with 10 poles.

The outer sides of the salient poles Nc and Sc in the radial direction protrude toward the stator 21 side beyond a radius intermediate between the maximum outer radius and the minimum inner radius of the permanent magnet 13, which is defined in the same manner as in FIG. 1.

Further, a non-magnetic portion 16a is provided in contact with end surfaces of the permanent magnet 13 and the non-magnetic portion 16b on the inner circumferential side. This portion may be air or may be filled with resin, or a non-magnetic metal such as stainless or aluminum may be interposed in this part.

Thus, flux leakage of the permanent magnet 13 can be reduced, whereby torque of the motor 10 can be increased. A joint portion 17 is provided between the rotor iron core 12 between the adjacent permanent magnets 13 and the rotor iron core 12 provided so as to surround the outer circumference of the shaft 14. The joint portion 17 functions to mechanically join both rotor iron cores 12.

Such a rotor structure conventionally has a problem that, since the number of the permanent magnets 13 is reduced by half, distribution of the magnetic flux density is uneven as compared to the structure of the rotor shown in FIG. 3, resulting in increase in torque ripple.

Besides, since the stator iron core 22 has a closed slot structure, there is a problem that increase in the torque ripple is also caused by magnetic saturation of the iron core due to flux leakage between the teeth 24.

However, according to the configuration of the present embodiment, by driving with the two three-phase inverters as shown in FIG. 2 such that the phase difference between the armature windings 30-1 and the armature windings 30-2 is an electrical angle of 20 to 40 degrees, or desirably, an electrical angle of 30 degrees, the sixth order component of torque ripple is greatly reduced.

Further, slits 19i and 19j are provided in the rotor iron core 12. These slits are provided at all magnetic poles. In addition, the slits 19i and 19j are located symmetrically with respect to the center line of the permanent magnet 13 indicated by a dotted line passing through the rotation center O in FIG. 12. Further, the shapes of the slits are such that the slits become away from the center line of the permanent magnet 13 as approaching the outer side in the radial direction of the rotor 11.

Such shapes provide an effect of guiding magnetic flux to the salient pole Nc side and the salient pole Sc side to converge the magnetic flux on the vicinity of the salient pole Nc and the salient pole Sc, thereby improving torque of the motor 10.

Further, by forming the rotor iron core 12 in the vicinity of the salient pole Nc and the salient pole Sc into a shape not being rotationally symmetric, even-number order components of magnetomotive force harmonics due to asymmetry shown in FIG. 9 which cause a problem in the case of consequent-pole type, can be reduced, whereby an effect of reducing cogging torque and torque ripple is obtained.

Further, a surface 20a and a surface 20b of the rotor iron core 12 have curved-plane shapes symmetric with respect to the center line of the permanent magnet 13 indicated by a dotted line. By providing such curved surfaces, harmonics of a magnetomotive force waveform are reduced and a magnetic flux density waveform is smoothed, whereby cogging torque and torque ripple can be reduced.

In addition, the armature windings 30 are the same as in FIG. 10. In this configuration of the armature windings 30, as described in embodiment 4, no magnetomotive force harmonics of even-number orders appear in a magnetomotive force of the armature winding 30 in principle. Therefore, naturally, an effect is obtained that even if magnetomotive force harmonics of even-number orders are present on the rotor 11 side, torque ripple hardly increases.

FIG. 12 has shown an example in which a total of two slits are provided on both sides of each permanent magnet 13. However, as a matter of course, the number is not limited thereto, and the same effect is obtained even in the case of providing two or more slits.

Since the length of the permanent magnet 13 in the radial direction is greater than the length thereof in the circumferential direction as shown in FIGS. 11 and 12, magnetic flux is converged on the rotor iron core 12, whereby a gap magnetic flux density can be increased. Therefore, a motor 10 with high torque can be formed even with a magnet having a small residual magnetic flux density.

For example, even in the case of using an inexpensive permanent magnet 13 having a residual magnetic flux density of 1 T or smaller, e.g., 0.7 T to 0.9 T, the same torque can be obtained with the same size as in the case of using neodymium sintered magnet having a residual magnetic flux density of about 1.2 T to 1.3 T, whereby an effect of reducing the cost of the permanent magnet 13 is obtained.

Embodiment 6

Figure 16:
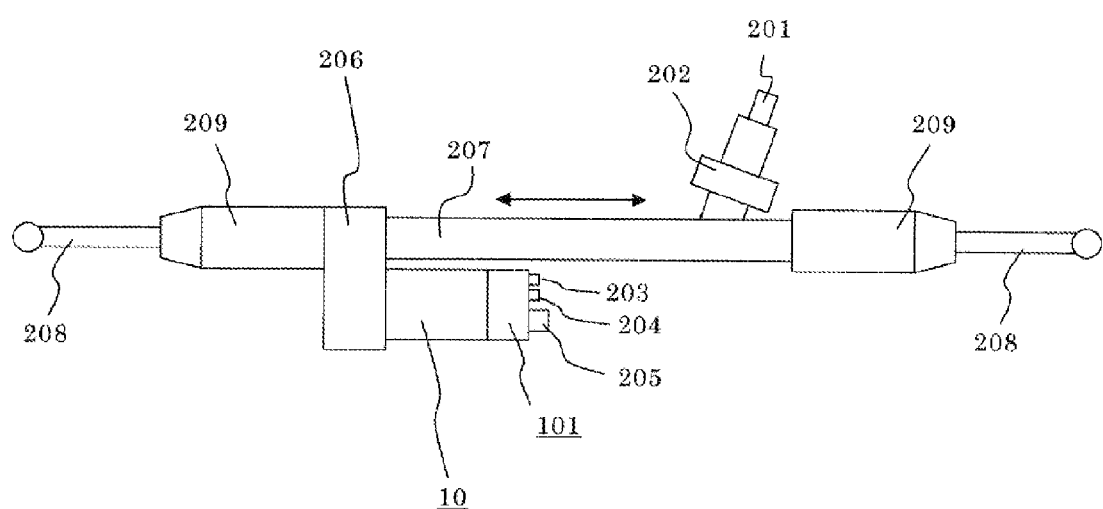
FIG. 16 is an explanation diagram showing an electric power steering apparatus of embodiment 6 of the present invention.

FIG. 16 is an explanation diagram of an electric power steering apparatus of an automobile.

A driver steers a steering wheel (not shown), and the resultant torque is transmitted to a shaft 201 via a steering shaft (not shown).

At this time, the torque detected by a torque sensor 202 is converted into an electric signal and then the electric signal is transmitted through a cable (not shown) to an ECU 101 via a connector 203.

Meanwhile, information about the automobile such as the velocity thereof is converted into an electric signal and then the electric signal is transmitted to the ECU 101 via a connector 204. The ECU 101 calculates required assist torque from the above torque and the information about the automobile such as the velocity thereof, and thereby supplies current to a permanent magnet motor 10 through inverters 102-1 and 102-2 as shown in FIG. 4. The motor 10 is provided in parallel to the movement direction (indicated by an arrow) of a rack shaft.

In addition, power is supplied from a battery or an alternator to the ECU 101 via a power supply connector 205. Torque generated by the permanent magnet motor 10 is decelerated by a gear box 206 containing a belt (not shown) and a ball screw (not shown), and generates thrust for moving the rack shaft (not shown) provided inside a housing 207 in the direction of the arrow, thereby assisting a steering force for the driver.

As a result, a tie rod 208 is moved and a wheel is turned, whereby the automobile can be turned. Owing to the assist by the torque of the permanent magnet motor 10, the driver can turn the automobile with a less steering force.

It is noted that a rack boot 209 is provided for preventing a foreign material from entering the inside of the apparatus.

In such electric power steering apparatuses, since cogging torque and torque ripple caused by the motor 10 are transmitted to a driver via a gear, it is desirable that the cogging torque and torque ripple are small in order to obtain a preferable steering feeling.

In addition, it is also desirable that vibration and noise upon operation of the motor 10 are small.

Considering the above, by applying the motors 10 described in embodiments 1 to 5, the effects described in these embodiments can be obtained.

In addition, since vibration and noise can be reduced even in a large-output motor, by applying the motors described in embodiments 1 to 5, an effect is obtained that an electric power steering apparatus can be applied also to a large vehicle and fuel efficiency can be reduced.

As a matter of course, although not shown, the motor of the present invention is also applicable to a steer-by-wire type, so that the same effect can be obtained.

Figure 14:
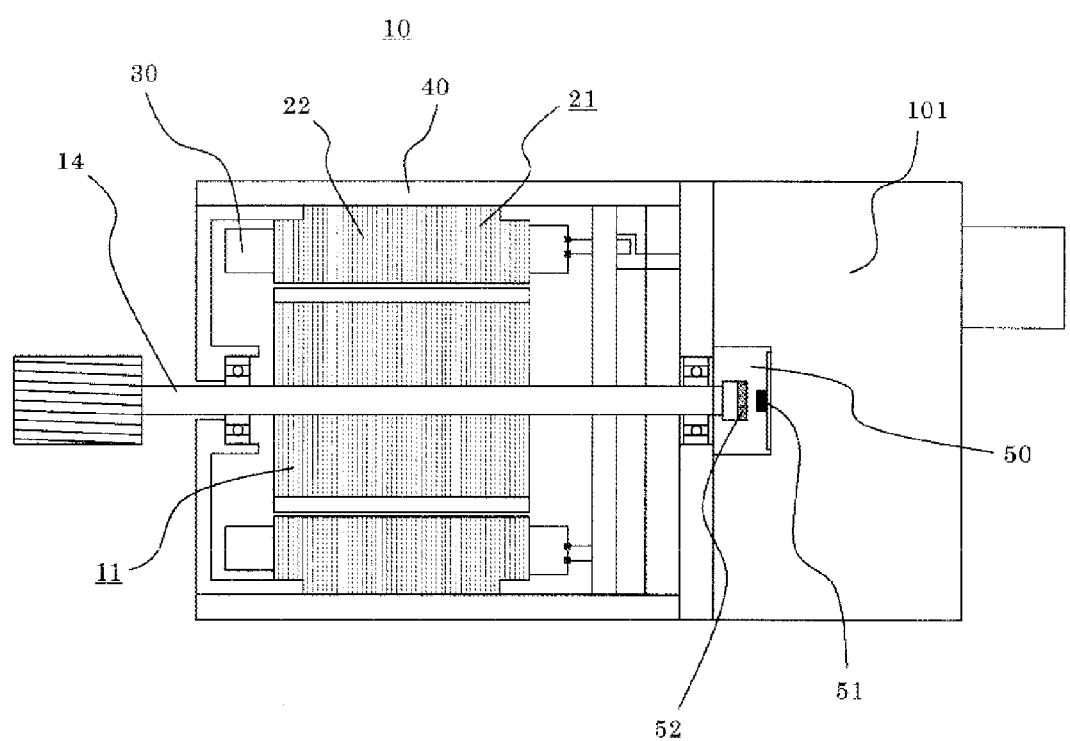
FIG. 14 is an explanation diagram showing a permanent magnet motor provided with a rotational angle sensor.

FIG. 14 is an example of the permanent magnet motor 10, in which the ECU is integrally provided in back of the permanent magnet motor. In a rotational angle sensor 50 of the motor 10, a permanent magnet 52 is provided at an end of the shaft 14. The permanent magnet 52 rotates along with the shaft 14.

A magnetic field detecting element is disposed at a position facing to the permanent magnet 52. A magnetic field is detected by the magnetic field detecting element, and then a rotational angle is detected from the direction of the magnetic field. By magnetizing the permanent magnet 52 at two polarities, the magnetic field rotates one revolution while the shaft 14, i.e., the rotor 11 rotates one revolution, thereby realizing a sensor with a shaft angle multiplier of 1×. Thus, in the case of using a sensor of 1×, even if the pole pair number of the motor 10 is increased to, for example, 3 or more, the frequency of sensor error is constant, and therefore the frequencies of vibration and noise due to angle error of the sensor remain small, so that an effect of reducing noise in an auditory sense is obtained.

Since operation is possible under any pole pair number, there is an advantage in terms of system that the rotational angle sensor can be commonly applied to the motors 10 with various pole numbers.

Figure 15:
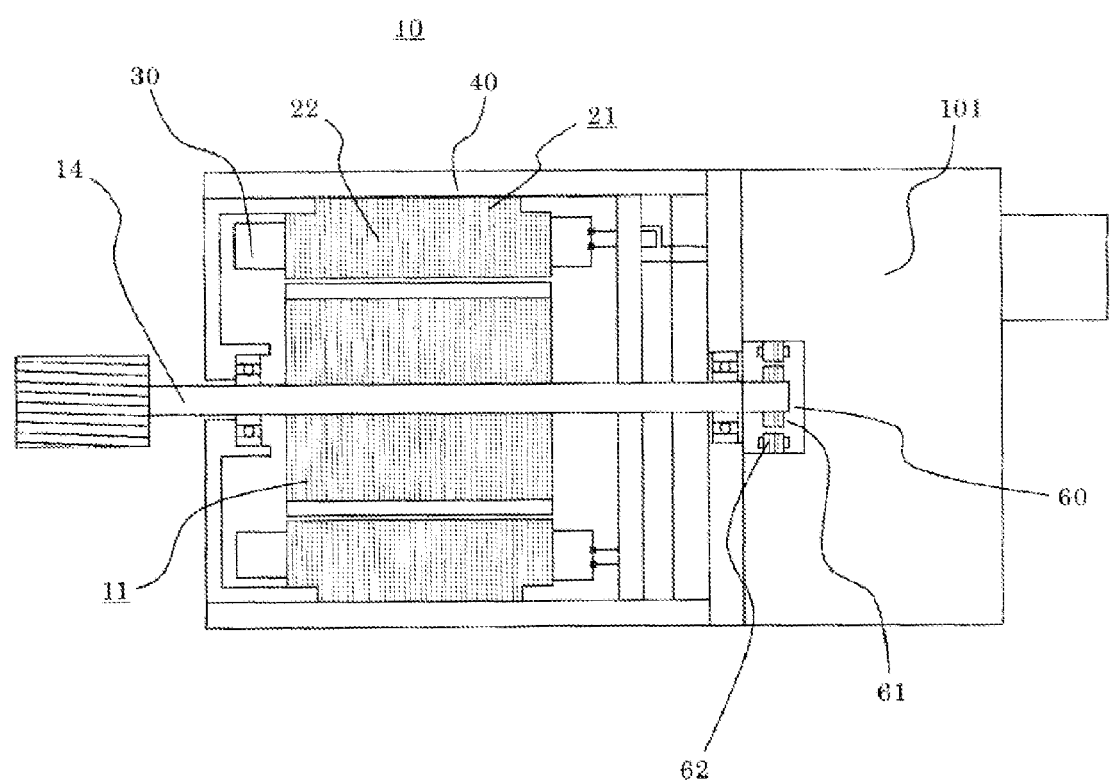
FIG. 15 is an explanation diagram showing a permanent magnet motor provided with a resolver.

FIG. 15 is another example of the permanent magnet motor 10, in which the ECU is integrally provided in back of the permanent magnet motor. A rotor 61 of a VR (variable reluctance) resolver 60 with a shaft angle multiplier of NX is provided at an end of the shaft 14, and a stator 62 of the resolver 60 is provided on the outer side in the radial direction of the rotor 61 of the resolver 60.

Since a VR resolver of NX is an inexpensive rotational angle sensor having an excellent environment resistance, an effect is obtained that an inexpensive electric power steering system having an excellent environment resistance can be structured.

It is noted that, within the scope of the present invention, the above embodiments may be freely combined with each other, or each of the above embodiments may be modified or abbreviated as appropriate.

DESCRIPTION OF THE REFERENCE CHARACTERS 10 motor
11 rotor
12 rotor iron core
13 permanent magnet
14 shaft
15 curved surface portion
16a, 16b non-magnetic portion
17 joint portion
18 protruding portion
19a to 19j slit
20a, 20b surface
21 stator
22 stator iron core
23 core back
24 tooth
25 slot
30 armature winding
30-1 first armature winding
30-2 second armature winding
40 frame
50 rotational angle sensor
51 magnetic field detecting element
52 permanent magnet
60 resolver
61 rotor of resolver
62 stator of resolver
101 ECU
102 inverter
102-1 first inverter
102-2 second inverter
103 power supply
104 coil
105 power supply relay
105-1 first power supply relay
105-2 second power supply relay
106-1 capacitor
106-2 capacitor
107-1 to 107-6 MOS-FET
108-1 to 108-6 MOS-FET
109-1 to 109-3 shunt
110-1 to 110-3 shunt
111 rotational angle sensor
201 shaft
202 torque sensor
203 connector
204 connector
205 power supply connector
206 gear box
207 housing
208 tie rod
209 rack boot

The invention claimed is:
1. A permanent magnet motor comprising:
a rotor including a rotor iron core and a plurality of permanent magnets provided in the rotor iron core; and
a stator including a stator iron core and two sets of three-phase armature windings provided in a plurality of slots formed in the stator iron core, wherein
one set of the armature windings is supplied with current from a first inverter, and the other set of the armature windings is supplied with current from a second inverter,
in the case where a pole number of the rotor is M and a slot number of the stator iron core is Q, M and Q satisfy a relationship of M <Q and a greatest common divisor of M and Q is equal to or greater than 3,
in the rotor, the rotor iron core is located on the stator side beyond a radius intermediate between the maximum outer radius and the minimum inner radius of the permanent magnets,
a phase difference between three-phase currents supplied from the first inverter and three-phase currents supplied from the second inverter is controlled to fall within a range of electric angles of 20 to 40 degrees,
a M number of the permanent magnets are arranged along the circumferential direction of the rotor, where M is the pole number of the rotor, and are provided at a surface of the rotor iron core, and a protruding portion made of magnetic material is present between the adjacent permanent magnets of the rotor, and an outer side of the protruding portion in a radial direction protrudes toward the stator side beyond a radius intermediate between the maximum outer radius and the minimum inner radius of the permanent magnets.

2. The permanent magnet motor according to claim 1, wherein the armature windings are wound in a distributed manner, a value of Q/(3M) which is a slot number for each pole for each phase is an integer, and further, the value of Q/(3M) is an even number equal to or greater than 2.

3. The permanent magnet motor according to claim 1, wherein the permanent magnets have a planar shape.

4. The permanent magnet motor according to claim 1, wherein a phase difference between three-phase currents supplied from the first inverter and three-phase currents supplied from the second inverter is controlled to be an electric angle of 30 degrees.

5. An electric power steering apparatus comprising the permanent magnet motor according to claim 1.

6. A permanent magnet motor for electric power steering apparatus, in which an ECU is integrally provided in back of the permanent magnet motor according to claim 1, wherein
a sensor with a shaft angle multiplier of 1× is used for a rotational angle sensor of the motor, and
a pole pair number of the motor is equal to or greater than 3.

7. A permanent magnet motor for electric power steering apparatus, in which an ECU is integrally provided in back of the permanent magnet motor according to claim 1, wherein
a VR resolver with a shaft angle multiplier of NX is used for a rotational angle sensor of the motor, and
a pole pair number N of the motor is equal to or greater than 3.

8. A permanent magnet motor comprising:
a rotor including a rotor iron core and a plurality of permanent magnets provided in the rotor iron core; and
a stator including a stator iron core and two sets of three-phase armature windings provided in a plurality of slots formed in the stator iron core, wherein
one set of the armature windings is supplied with current from a first inverter, and the other set of the armature windings is supplied with current from a second inverter,
in the case where a pole number of the rotor is M and a slot number of the stator iron core is Q, M and Q satisfy a relationship of M <Q and a greatest common divisor of M and Q is equal to or greater than 3,
in the rotor, the rotor iron core is located on the stator side beyond a radius intermediate between the maximum outer radius and the minimum inner radius of the permanent magnets,
a phase difference between three-phase currents supplied from the first inverter and three-phase currents supplied from the second inverter is controlled to fall within a range of electric angles of 20 to 40 degrees,
a M/2 number of the permanent magnets are arranged along the circumferential direction of the rotor, where M is the pole number of the rotor, and are provided at a surface of the rotor iron core, and
slits formed symmetrically with respect to a magnetic pole center of a salient pole, of the rotor, that corresponds to a magnetic pole having a polarity different from a polarity of a magnetic pole of each permanent magnet, are provided in the rotor iron core.

9. A permanent magnet motor comprising:
a rotor including a rotor iron core and a plurality of permanent magnets provided in the rotor iron core; and
a stator including a stator iron core and two sets of three-phase armature windings provided in a plurality of slots formed in the stator iron core, wherein
one set of the armature windings is supplied with current from a first inverter, and the other set of the armature windings is supplied with current from a second inverter,
in the case where a pole number of the rotor is M and a slot number of the stator iron core is Q, M and Q satisfy a relationship of M <Q and a greatest common divisor of M and Q is equal to or greater than 3,
in the rotor, the rotor iron core is located on the stator side beyond a radius intermediate between the maximum outer radius and the minimum inner radius of the permanent magnets,
a phase difference between three-phase currents supplied from the first inverter and three-phase currents supplied from the second inverter is controlled to fall within a range of electric angles of 20 to 40 degrees,
a M/2 number of the permanent magnets are arranged along the circumferential direction of the rotor, where M is the pole number of the rotor, and are embedded in the rotor iron core, and
slits formed symmetrically with respect to a magnetic pole center of a salient pole, of the rotor, that corresponds to a magnetic pole having a polarity different from a polarity of a magnetic pole of each permanent magnet, are provided in the rotor iron core.

10. A permanent magnet motor comprising:
a rotor including a rotor iron core and a plurality of permanent magnets provided in the rotor iron core; and
a stator including a stator iron core and two sets of three-phase armature windings provided in a plurality of slots formed in the stator iron core, wherein
one set of the armature windings is supplied with current from a first inverter, and the other set of the armature windings is supplied with current from a second inverter,
in the case where a pole number of the rotor is M and a slot number of the stator iron core is Q, M and Q satisfy a relationship of M <Q and a greatest common divisor of M and Q is equal to or greater than 3,
in the rotor, the rotor iron core is located on the stator side beyond a radius intermediate between the maximum outer radius and the minimum inner radius of the permanent magnets,
a phase difference between three-phase currents supplied from the first inverter and three-phase currents supplied from the second inverter is controlled to fall within a range of electric angles of 20 to 40 degrees,
a M/2 number of the permanent magnets are arranged along the circumferential direction of the rotor, where M is the pole number of the rotor,
the permanent magnets have a rectangular sectional shape in which a length thereof in a radial direction is greater than a length thereof in a circumferential direction, and are embedded in the rotor iron core,
the rotor iron core has a shape symmetric with respect to a center line of a first non-magnetic portion provided between a portion corresponding to an N pole and a portion corresponding to an S pole of the rotor iron core, which are formed in accordance with the magnetization directions of the permanent magnets, and a surface of the rotor iron core has a curved-plane shape symmetric with respect to a center line of each permanent magnet.

11. The permanent magnet motor according to claim 10, wherein magnetization directions of the permanent magnets are set such that surfaces facing to each other of the adjacent permanent magnets have the same pole, the rotor iron core is interposed between the adjacent permanent magnets, and a second non-magnetic portion is provided in contact with an end surface of each permanent magnet on an inner circumferential side.

12. The permanent magnet motor according to claim 10, wherein slits formed symmetrically with respect to the center line of each permanent magnet are provided in the rotor iron core, and the slits have such shapes that the slits become away from the center line of each permanent magnet as approaching an outer side in a radial direction of the rotor.

13. The permanent magnet motor according to claim 10, wherein a residual magnetic flux density of each permanent magnet is equal to or smaller than 1T.

* * * * *